(12) United States Patent
Hirakawa et al.

(10) Patent No.: US 8,378,565 B2
(45) Date of Patent: *Feb. 19, 2013

(54) ELECTRON EMITTING ELEMENT HAVING AN ELECTRON ACCELERATION LAYER USING FINE PARTICLE LAYER

(75) Inventors: Hiroyuki Hirakawa, Osaka (JP); Ayae Nagaoka, Osaka (JP); Yasuo Imura, Osaka (JP); Tadashi Iwamatsu, Osaka (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 41 days.

This patent is subject to a terminal disclaimer.

(21) Appl. No.: 12/698,435

(22) Filed: Feb. 2, 2010

(65) Prior Publication Data
US 2010/0327730 A1   Dec. 30, 2010

(30) Foreign Application Priority Data

Jun. 25, 2009  (JP) ................................. 2009-151559
Jun. 25, 2009  (JP) ................................. 2009-151561

(51) Int. Cl.
*H01J 1/02*  (2006.01)
*H01J 9/02*  (2006.01)

(52) U.S. Cl. ........................... 313/491; 313/235; 445/35
(58) Field of Classification Search .......... 313/495–498, 313/491; 445/35

See application file for complete search history.

(56) References Cited

U.S. PATENT DOCUMENTS

| | | |
|---|---|---|
| 4,857,161 A | 8/1989 | Borel |
| 5,891,548 A | 4/1999 | Graiver |
| 5,962,959 A | 10/1999 | Iwasaki et al. |
| 6,023,124 A | 2/2000 | Chuman et al. |
| 6,130,503 A | 10/2000 | Negishi et al. |

(Continued)

FOREIGN PATENT DOCUMENTS

| | | |
|---|---|---|
| CN | 1755889 | 4/2006 |
| CN | 1763885 A | 4/2006 |

(Continued)

OTHER PUBLICATIONS

U.S. Appl. No. 12/956,136, filed Nov. 30, 2010, entitled "Electron Emitting Element, Method for Producing Electron Emitting Element, Electron Emitting Device, Charging Device, Image Forming Apparatus, Electron-Beam Curing Device, Image Display Device, Air Blowing Device, Cooling Device" (not yet published), Hiroyuki Hirakawa.

(Continued)

*Primary Examiner* — Tracie Y Green
(74) *Attorney, Agent, or Firm* — Nixon & Vanderhye, P.C.

(57) ABSTRACT

An electron emitting element includes an electrode substrate, a thin-film electrode, and an electron acceleration layer provided between them. The electron acceleration layer includes a fine particle layer containing insulating fine particles, which is provided on a side of the electrode substrate, and a deposition of conductive fine particles, which is provided on a surface of the fine particle layer. In the electron acceleration layer, a conductive path is formed in advance, and the deposition has a physical recess which is an exit of the conductive path and which serves as an electron emitting section. Electrons are emitted via the electron emitting section. With the arrangement, it is possible to realize an electron emitting element which prevents that an electrode on an electron emission side gradually wears off along with electron emission and which can maintain an electron emission characteristic for a long period.

10 Claims, 15 Drawing Sheets

U.S. PATENT DOCUMENTS

| | | | |
|---|---|---|---|
| 6,166,487 A | 12/2000 | Negishi et al. | |
| 6,462,467 B1 | 10/2002 | Russ | |
| 6,626,724 B2 * | 9/2003 | Yamamoto et al. | 445/24 |
| 6,628,053 B1 | 9/2003 | Den et al. | |
| 6,844,664 B2 | 1/2005 | Komoda et al. | |
| 7,723,909 B2 | 5/2010 | Yamaguchi et al. | |
| 8,110,971 B2 * | 2/2012 | Hirakawa et al. | 313/311 |
| 2001/0017369 A1 | 8/2001 | Iwasaki et al. | |
| 2001/0026123 A1 | 10/2001 | Yoneda | |
| 2002/0136896 A1 | 9/2002 | Takikawa et al. | |
| 2003/0102793 A1 | 6/2003 | Komoda et al. | |
| 2004/0021434 A1 | 2/2004 | Yoneda | |
| 2004/0046914 A1 | 3/2004 | Hirota | |
| 2004/0150768 A1 | 8/2004 | Shimizu et al. | |
| 2004/0197943 A1 | 10/2004 | Izumi | |
| 2004/0201345 A1 | 10/2004 | Hirokado | |
| 2004/0246408 A1 | 12/2004 | Ando | |
| 2005/0181566 A1 | 8/2005 | Machida et al. | |
| 2005/0212398 A1 | 9/2005 | Okano et al. | |
| 2006/0012278 A1 * | 1/2006 | Nanataki et al. | 313/309 |
| 2006/0061967 A1 | 3/2006 | Kim et al. | |
| 2006/0065895 A1 | 3/2006 | Kusunoki et al. | |
| 2006/0152138 A1 | 7/2006 | Hori et al. | |
| 2006/0186786 A1 | 8/2006 | Iwamatsu et al. | |
| 2006/0244357 A1 | 11/2006 | Lee | |
| 2006/0284543 A1 | 12/2006 | Chung et al. | |
| 2006/0290291 A1 | 12/2006 | Aizawa | |
| 2006/0291905 A1 | 12/2006 | Hirakawa et al. | |
| 2007/0210697 A1 * | 9/2007 | Tamura et al. | 313/496 |
| 2007/0222067 A1 * | 9/2007 | Nanataki et al. | 257/734 |
| 2009/0091526 A1 | 4/2009 | Hirota | |
| 2010/0196050 A1 | 8/2010 | Iwamatsu et al. | |
| 2010/0215402 A1 | 8/2010 | Nagaoka | |
| 2010/0278561 A1 | 11/2010 | Kanda | |
| 2010/0295465 A1 | 11/2010 | Hirakawa | |
| 2010/0296842 A1 | 11/2010 | Imura | |
| 2010/0296843 A1 | 11/2010 | Hirawaka | |
| 2010/0296844 A1 | 11/2010 | Imura | |
| 2010/0296845 A1 | 11/2010 | Hirakawa | |
| 2010/0307724 A1 | 12/2010 | Ichii et al. | |

FOREIGN PATENT DOCUMENTS

| | | |
|---|---|---|
| CN | 1849673 A | 10/2006 |
| EP | 1 617 450 A2 | 1/2006 |
| EP | 1617449 | 1/2006 |
| EP | 1 635 369 | 3/2006 |
| JP | 60-20027 A | 2/1985 |
| JP | 62-172631 | 7/1987 |
| JP | 1-107440 A | 4/1989 |
| JP | 1-149335 A | 6/1989 |
| JP | 01-279557 | 11/1989 |
| JP | 01-298623 | 12/1989 |
| JP | 6-255168 A | 9/1994 |
| JP | 8-97582 A | 4/1996 |
| JP | 8-250766 A | 9/1996 |
| JP | 9-007499 A | 1/1997 |
| JP | 9-252068 A | 9/1997 |
| JP | 10-121042 | 5/1998 |
| JP | 10-308164 A | 11/1998 |
| JP | 10-308165 | 11/1998 |
| JP | 10-308166 | 11/1998 |
| JP | 11-251069 A | 9/1999 |
| JP | 2000-76986 A | 3/2000 |
| JP | 2000-311640 | 11/2000 |
| JP | 2001-68012 A | 3/2001 |
| JP | 2001-195973 A | 7/2001 |
| JP | 2001-357961 | 12/2001 |
| JP | 2002-93310 A | 3/2002 |
| JP | 2002-208346 A | 7/2002 |
| JP | 2002-279892 A | 9/2002 |
| JP | 2003-115385 | 4/2003 |
| JP | 2003-173744 A | 6/2003 |
| JP | 2003-173878 A | 6/2003 |
| JP | 2003-331712 | 11/2003 |
| JP | 2004-241161 | 8/2004 |
| JP | 2004-253201 A | 9/2004 |
| JP | 2004-296781 | 10/2004 |
| JP | 2004-296950 | 10/2004 |
| JP | 2004-327084 A | 11/2004 |
| JP | 2005-5205 | 1/2005 |
| JP | 2005-190878 A | 7/2005 |
| JP | 2005-209396 A | 8/2005 |
| JP | 2005-268025 | 9/2005 |
| JP | 2005-326080 A | 11/2005 |
| JP | 2005-328041 | 11/2005 |
| JP | 2006-054162 | 2/2006 |
| JP | 2006-100758 A | 4/2006 |
| JP | 2006-190545 A | 7/2006 |
| JP | 2006-236964 | 9/2006 |
| JP | 2006-351524 | 12/2006 |
| JP | 2007-290873 | 11/2007 |
| JP | 2009-019084 | 1/2009 |
| JP | 2009-092902 | 4/2009 |
| JP | 2009-46891 A | 7/2009 |
| JP | 2009-146891 A | 7/2009 |
| JP | 4314307 B1 | 8/2009 |
| JP | 2010-267492 A | 11/2010 |
| TW | 200638455 | 7/1994 |
| TW | I237722 | 8/2005 |
| TW | I257117 | 6/2006 |
| TW | I278696 | 4/2007 |
| TW | I287241 | 9/2007 |
| WO | 98/27568 | 6/1998 |
| WO | 2005/004545 A1 | 1/2005 |
| WO | 2009/066723 | 5/2009 |

OTHER PUBLICATIONS

U.S. Appl. No. 12/695,381, filed Jan. 28, 2010, entitled Electron Emitting Element, Electron Emitting Device, Light Emitting Device, Image Display Device, Air Blowing Device, Cooling Device, Charging Device, Image Forming Apparatus, Electron-Beam Curing Device, and Method for Producing Electron Emitting Element.

U.S. Appl. No. 12/696,905, filed Jan. 29, 2010, entitled Electron Emitting Element, Electron Emitting Device, Light Emitting Device, Image Display Device, Air Blowing Device, Cooling Device, Charging Device, Image Forming Apparatus, Electron-Beam Curing Device, and Method for Producing Electron Emitting Element.

U.S. Appl. No. 12/698,342, filed Feb. 2, 2010, entitled Electron Emitting Element, Electron Emitting Device, Light Emitting Device, Air Blowing Device, Charging Device, Electron-Beam Curing Device, and Method for Producing Electron Emitting Element.

U.S. Appl. No. 12/699,349, filed Feb. 3, 2010, entitled "Electron Emitting Element, Electron Emitting Device, Light Emitting Device, Image Display Device, Cooling Device, and Charging Device".

U.S. Appl. No. 12/940,546, filed Nov. 5, 2010, entitled "Heat Exchanger".

English version of ISR for PCT/JP2009/052904 mailed Apr. 21, 2009.

ISR for PCT/JP2008/071102, mailed Feb. 24, 2009.

Electrophotography-Bases and Applications (1998; p. 213), The Society of Electrophotography of Japan, Corona Publishing Co., Ltd. (with partial English translation).

Ionic winds for locally enhanced cooling, David B. Go, Suresh V. Garimella, and Timothy S. Fisher, J. Appl. Phys., 102, 053302 (2007).

Naoi et al, "TiO2 Films Loaded with Silver Nanoparticles: Control of Multicolor Photochromic Behavior" J. Am. Chem. Soc., vol. 126, No. 11, p. 3664-3668 (2004).

Yamaguchi and three others, "Development of Highly Efficient Electron-Beam Source by Use of Carbon Nanotube for Image Recording", Collected Papers of Japan Hardcopy 97, The Imaging Society of Japan, p. 221-224, Jul. 1997 (with partial English translation).

U.S. Appl. No. 12/781,997, filed May 18, 2010, entitled "Electron Emitting Element, Electron Emitting Device, Charging Device, Image Forming Apparatus, Electron-Beam Curing Device, Light Emitting Device, Image Display Device, Air Blowing Device, and Cooling Device".

U.S. Appl. No. 12/782,024, filed May 18, 2010, entitled "Light Emitting Element, Light Emitting Device, Image Display Device, Method of Driving Light Emitting Element, and Method of Producing Light Emitting Element".

U.S. Appl. No. 12/782,102, filed May 18, 2010, entitled "Electron Emitting Element, Electron Emitting Device, Light Emitting Device, Image Display Device, Air Blowing Device, Cooling Device, Charging Device, Image Forming Apparatus, and Electron-Beam Curing Device".

U.S. Appl. No. 12/743,741, filed May 19, 2010, entitled Electron Emitting Element, Electron Emitting Device, Light Emitting Device, Image Display Device, Air Blowing Device, Cooling Device, Charging Device, Image Forming Apparatus, Electron-Beam Curing Device, and Method for Producing Electron Emitting Element.

Naoi et al., "TiO2 Films Loaded with Silver Nanoparticles: Control of Multicolor Photochromic Behavior", J. Am. Chem. Soc., vol. 126, No. 11, pp. 3664-3668, (2004).

Yamaguchi et al, "Development of Highly Efficient Electron-Beam Source by Use of Carbon Nanotube for Image Recording", Collected Papers of Japan Hardcopy 97, The Imaging Society of Japan, Jul. 1997, pp. 221-224.

U.S. Office Action issued for co-pending U.S. Appl. No. 12/699,349, dated Apr. 16, 2012.

U.S. Notice of Allowance issued for co-pending U.S. Appl. No. 12/781,997, dated Apr. 17, 2012.

U.S. Office Action issued for co-pending U.S. Appl. No. 12/743,741, mailed Jun. 22, 2012.

U.S. Office Action issued for co-pending U.S. Appl. No. 12/698,342, mailed Jul. 19, 2012.

U.S. Office Action (Restriction Requirement) issued in co-pending U.S. Appl. No. 12/695,381, dated Sep. 7, 2012.

U.S. Office Action issued in co-pending U.S. Appl. No. 12/698,342, dated Nov. 27, 2012.

* cited by examiner

ELECTRON EMITTING ELEMENT HAVING AN ELECTRON ACCELERATION LAYER USING FINE PARTICLE LAYER This Nonprovisional application claims priority under U.S.C. §119(a) on Patent Applications No. 2009-151559 filed in Japan on Jun. 25, 2009 and No. 2009-151561 filed in Japan on Jun. 25, 2009, the entire contents of which are hereby incorporated by reference.

TECHNICAL FIELD

The present invention relates to an electron emitting element, a method for producing the electron emitting element, an electron emitting device, a light emitting device, and an image display device.

BACKGROUND ART

A Spindt-type electrode and a carbon nanotube electrode (CNT) have been known as conventional electron emitting elements. Applications of such conventional electron emitting elements to, for example, the field of Field Emission Display (FED) have been studied. Such electron emitting elements are caused to emit electrons by tunnel effect resulting from formation of an intense electric field of approximately 1 GV/m that is produced by application of a voltage to a pointed section.

However, each of these two types of the electron emitting elements has an intense electric field in the vicinity of a surface of an electron emitting section. Accordingly, electrons emitted obtain a large amount of energy due to the electric field. This makes it easy to ionize gas molecules. However, cations generated in the ionization of the gas molecules are accelerated in a direction of a surface of the electron emitting element due to the intense electric field and collide with the surface. This causes a problem of breakdown of the electron emitting element due to sputtering.

Further, ozone is generated before ions are generated, because oxygen in the atmosphere has dissociation energy that is lower than ionization energy. Ozone is harmful to human bodies, and oxidizes various substances because of its strong oxidizing power. This causes a problem in that members around the electron emitting element are damaged. In order to prevent this problem, the members used around the electron emitting element are limited to members that have high resistance to ozone.

In order to solve this problem, an MIM (Metal Insulator Metal) type and an MIS (Metal Insulator Semiconductor) type have been known as other types of electron emitting elements. These electron emitting elements are surface-emission-type electron emitting elements which accelerate electrons by utilizing quantum size effect and an intense electric field in the electron emitting element so that electrons are emitted from a flat surface of the element. These electron emitting elements do not require an intense electric field outside the elements, because the electrons which are accelerated in an electron acceleration layer inside the elements are emitted to the outside. Therefore, each of the MIM type and the MIS type electron emitting elements can overcome such problems that (i) the element is broken down by the sputtering which occurs due to ionization of gas molecules and (ii) ozone is generated, in the Spindt-type, CNT type, and BN type electron emitting elements.

For example, Patent Literature 1 discloses an MIM type electron emitting element in which an insulating film having fine particles made of metal or the like dispersed therein is provided between two electrodes. The MIM type electron emitting element emits electrons in such a manner that electrons are injected from one (a substrate electrode) of the electrodes into the insulating film, the electrons thus injected are accelerated in the insulating film, and the electrons are emitted to outside through the other electrode (electron-emitting side electrode) having a thickness of several tens Å to 1000 Å.

CITATION LIST

Patent Literature 1
Japanese Patent Application Publication, Tokukaihei, No. 1-298623 A (Publication Date: Dec. 1, 1989)
Patent Literature 2
Japanese Patent Application Publication, Tokukaihei, No. 1-279557 A (Publication Date: Nov. 9, 1989)
Non Patent Literature 1

SUMMARY OF INVENTION

Technical Problem

However, such a configuration disclosed in Patent Literature 1 in which the electrons are emitted from the electron-emitting side electrode has such a problem that the electron-emitting side electrode is inversely sputtered with the emitted electrons. The "inversely sputtered" means that the electron-emitting side electrode becomes a target to be sputtered with the emitted electrons. As a result, a constituent metal material of the electron-emitting side electrode gradually but surely wears off, and finally loses its function as an electrode. This problem also occurs general electron emitting elements in which an electron-emitting side electrode is a plane electrode.

An object of the present invention is to provide an electron emitting element which prevents that an electron-emitting side electrode gradually wears off along with emission of electrodes and which can maintain its electron emission characteristic for a long period, and a method for producing the electron emitting element.

Solution to Problem

In order to achieve the above object, an electron emitting element of the present invention includes: an electrode substrate and a thin-film electrode, which are provided so as to face each other; and an electron acceleration layer sandwiched between the electrode substrate and the thin-film electrode, the electron emitting element (i) accelerating electrons in the electron acceleration layer at a time when a voltage is applied between the electrode substrate and the thin-film electrode and (ii) emitting the electrons from the thin-film electrode, the electron acceleration layer including a fine particle layer containing insulating fine particles to which fine particle layer a single material or a mixed material that facilitates electricity flow in a thickness direction of the fine particle layer is applied, and the electron acceleration layer including a conductive path formed therein in advance such that the conductive path runs through the electron acceleration layer in a thickness direction of the electron acceleration layer, the conductive path having an exit serving as an electron emitting section via which the electrons are supplied to the thin-film electrode. Here, that a conductive path is formed in advance means that the conductive path is formed before the element is driven by applying a voltage to the element in vacuum, that is, the conductive path is formed in course of producing the electron emitting element.

An electron emitting device of the present invention includes: the electron emitting element as above; and a power supply section for applying a voltage between the electrode substrate and the thin-film electrode.

Further, a light emitting device including the electron emitting device of the present invention is also included in the scope of the present invention.

A method of the present invention for an electron emitting element is for producing an electron emitting element including an electrode substrate and a thin-film electrode, which are provided so as to face each other, and an electron acceleration layer provided between the electrode substrate and the thin-film electrode, the electron emitting element (i) accelerating electrons in the electron acceleration layer at a time when a voltage is applied between the electrode substrate and the thin-film electrode and (ii) emitting the electrons from the thin-film electrode, and the method of the present invention includes the steps of: (a) forming the electron acceleration layer in such a manner that a fine particle layer containing insulating fine particles is formed on the electrode substrate, and conductive fine particles are deposited on a surface of the fine particle layer so as to form a deposition of the conductive fine particles; (b) forming the thin-film electrode on a surface of the electron acceleration layer; and (c) carrying out a forming process of forming a conductive path in the electron acceleration layer by applying a direct voltage between the electrode substrate and the thin-film electrode in the atmosphere.

Advantageous Effects of Invention

In the configuration of the electron emitting element of the present invention, while a voltage is applied between the electrode substrate and the thin-film electrode, current flows in the electron acceleration layer and a part of electrons in the current becomes ballistic electrons due to an intense electric field formed by the voltage thus applied, thereby causing the ballistic electrodes to be emitted from a side of the thin-film electrode.

The electrons are emitted from an electron emitting section that is formed in advance in the electron acceleration layer positioned below the thin-film electrode, not from unprescribed portions on the side of the thin-film electrode. The electron emitting section is an exit of a conductive path, which is provided in the electron acceleration layer so as to run through the electron acceleration layer in a thickness direction of the electron acceleration layer. The electrons to be emitted from the thin-film electrode are supplied to the thin-film electrode via the conductive path and then emitted to outside from the thin-film electrode.

Such a conductive path (a conductive path formed in advance) can be easily formed by a forming process in the atmosphere, due to action of a single material or a mixed material which is provided in a fine particle layer containing insulating fine particles and which facilitates electricity flow in a thickness direction of the fine particle layer.

The forming process in the atmosphere is a process of applying a direct voltage between the electrode substrate and the thin-film electrode in the atmosphere, so as to form a conductive path for current in the element that flows from a side of the electrode substrate toward a side of the thin-film electrode via the fine particle layer Since the conductive path is formed in advance in the electron acceleration layer by the forming process in the atmosphere as such, even if a voltage is subsequently applied to the element in vacuum so that the electrons are emitted, the current in the element flows through the conductive path thus formed in advance, without newly forming any conductive paths due to the voltage application. Consequently, the conductive path stably functions during electron emission. In contrast, in a case where a voltage is applied, in vacuum, to an element that is not subjected to the forming process in the atmosphere and therefore has no conductive path, the voltage application causes a conductive path to be formed and electrons to be emitted at the same time. That is, the conductive path is being formed while the electrons are being emitted. The conductive path thus formed under such a condition is not constant, and a new conductive path is formed every time when a voltage is applied to the element in vacuum. As a result, every time when the voltage is applied in vacuum, a conductive state of the element changes, thereby resulting in that a stable electron emission characteristic cannot be obtained.

As such, in the electron emitting element of the present invention, electrons are emitted not from unprescribed portions in the electron acceleration layer but from a specified portion, i.e., the electron emitting section in the electron acceleration layer. On this account, a portion, in the thin-film electrode, which is inversely sputtered with emitted electrons is limited to a portion positioned right above the electron emitting section and a portion positioned in the vicinity of the electron emitting section. Accordingly, other portions in the thin-film electrode except for the portion right above the electron emitting section and the portion in the vicinity of the electron emitting section are not exposed to the electrons, thereby preventing that the thin-film electrode wears off as a constituent metal material of the thin-film electrode is sputtered with the emitted electrons, and finally loses its function as an electrode.

As has been already described in terms of the electron emitting element, the electron emitting element of the present invention is an electron emitting element that prevents that the thin-film electrode gradually wears off along with the electron emission and therefore can maintain its electron emission characteristic for a long period. As a result, an electron emitting device including such an electron emitting element can also maintain its electron emission characteristic for a long period. Further, a light emitting device including the electron emitting device can also maintain its electron emission characteristic for a long period.

With a method of the present invention for producing an electron emitting element, it is possible to obtain an electron emitting element which prevents that a thin-film electrode provided on an electron emitting side wears off along with electron emission and which can maintain its electron emission characteristic for a long period.

DESCRIPTION OF EMBODIMENTS

As described above, a first object of the present invention is to provide (i) an electron emitting element which prevents an electron-emitting side electrode gradually wears off along with electron emission and which can maintain its electron emission characteristic for a long period, and (ii) a method for protruding the electron emitting element.

Further, a second object of the present invention is to provide an electron emitting element which can control (a) from which positions electrons are emitted in a thin-film electrode of the electron emitting element and (b) an amount of the electrons emitted per unit area, as well as preventing an electron-emitting side electrode gradually wears off along with electron emission and maintaining an electron emission characteristic for a long period.

The second object is for the purpose of solving the following problems. That is, in a configuration of an MIM type electron emitting element disclosed in Patent Literature 1, a position, in an insulating film, where current flows and an electron emitting section via which electrons are emitted, are accidentally formed in a plane of an electron-emitting side electrode, and they cannot be set at any given position. Accordingly, an electron emission position in the electron-emitting side electrode, an amount of electrons emitted per unit area, and the like cannot be controlled.

The amount of electrons emitted can be controlled by changing a voltage applied between two electrodes such that a low voltage causes a small amount of electrons emitted and a high voltage causes a large amount of electrons emitted. However, in the element disclosed in Patent Literature 1, the amount of electrons emitted becomes extremely small at a low voltage and an electron emission efficiency markedly decreases. On this account, such a control, by an applied voltage, of the amount of electrons emitted is not practical in cases of extremely reducing the amount of electrons emitted.

With reference to FIGS. 1 through 25 explained are embodiments and examples of an electron emitting element of the present invention and an electron emitting device of the present invention. The embodiments and examples described below are only concrete examples of the present invention, and the present invention is not limited to these.

Embodiments 1, 2

Figure 1:
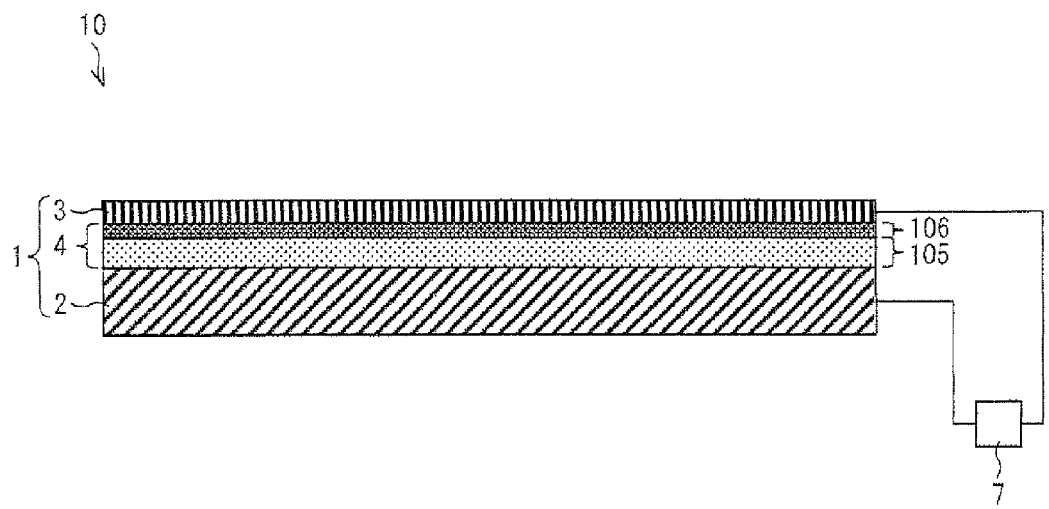
FIG. 1 is a schematic view illustrating a configuration of an electron emitting device including an electron emitting element according to Embodiment 1 of the present invention.

FIG. 1 is a schematic view illustrating a configuration of an electron emitting device 10 including an electron emitting element 1 according to one embodiment of the present invention.

As illustrated in FIG. 1, the electron emitting device 10 includes an electron emitting element 1 according to one embodiment of the present invention, and a power supply 7. The electron emitting element 1 includes: an electrode substrate 2 as a bottom electrode; a thin-film electrode 3 as an upper electrode; and an electron acceleration layer 4 sandwiched therebetween. The power supply 7 applies a voltage between the electrode substrate 2 and the thin-film electrode 3.

While the voltage is applied between the electrode substrate 2 and the thin-film electrode 3, current flows in the electrode acceleration layer 4 sandwiched between the electrode substrate 2 and the thin-film electrode 3. A part of electrons in the current is emitted from the electron acceleration layer 4 as ballistic electrons due to an intense electric field formed by the voltage thus applied, and the ballistic electrons are emitted outside the element from a side of the thin-film electrode 3.

The electrons thus emitted from the electron acceleration layer 4 are caused to pass (transmit) through the thin-film electrode 3 and are then emitted to the outside, or the electrons thus emitted are caused to transmit through holes (gaps) of the thin-film electrode 3, which holes are formed due to effects of unevenness or the like on a surface of the electron acceleration layer 4 provided below the thin-film electrode 3, and are then emitted to the outside.

As described above, a configuration in which electrons are emitted from unprescribed portions of the electron acceleration layer 4 provided below the thin-film electrode 3 causes such a problem that the thin-film electrode 3 provided on an electrode emitting side is sputtered with emitted electrons, thereby resulting in that the thin-film electrode 3 wears off over time and finally loses its function as an upper electrode.

In order to solve the problem, the electron emitting element of the present embodiment is configured such that electron emitting sections are provided in the electron acceleration layer 4 so that electrons are emitted from specific portions of the electron acceleration layer 4, not from a whole plane of the electron acceleration layer 4.

That is, the electron acceleration layer 4 includes a fine particle layer containing insulating fine particles, and a single material or a mixed material that facilitates electricity flow in a thickness direction of the fine particle layer is applied to the electron acceleration layer 4. Furthermore, the electron acceleration layer 4 includes a conductive path which is formed in the electron acceleration layer 4 in advance so as to run through the electron acceleration layer 4 in a thickness direction of the electron acceleration layer 4. An exit of the conductive path serves as an electron emitting section via which electrons are supplied to the thin-film electrode 3. That the conductive path is formed in advance means that the conductive path is formed before a voltage is applied to the electron emitting element 1 in vacuum so that the electron emitting element 1 is driven, that is, the conductive path is formed in course of producing the electron emitting element 1.

With the configuration, the electrons are not emitted from unprescribed portions to the side of the thin-film electrode 3, but are emitted to the side of the thin-film electrode 3 from the electron emitting section thus formed in advance in the electron acceleration layer 4 that is provided below the thin-film electrode 3. The electron emitting section is an exit of the conductive path, which is formed in advance so as to run through the electron acceleration layer 4 in the thickness direction of the electron acceleration layer 4. That is, electrons to be emitted from the thin-film electrode 3 to the outside are supplied to the thin-film electrode 3 via the conductive path and then emitted to the outside.

As such, in the electron emitting element 1, the electrons are not emitted from unprescribed portions of the electron acceleration layer 4, but a portion from which the electrons are emitted is specified to the electron emitting section of the electron acceleration layer 4, which is the exit of the conductive path thus formed in advance. As a result, a portion of the thin-film electrode 3 that is inversely sputtered with the emitted electrons is limited to a portion positioned right above the electron emitting section and a portion positioned in the vicinity of the electron emitting section. The other portions except for the above portions are not exposed to the electrons. As a result, it can be prevented that a constituent metal material of the thin-film electrode is inversely sputtered with the emitted electrons so that the thin-film electrode wears off over time and finally loses its function as an electrode.

FIG. 1 illustrates the electron emitting element 1 in which the single material or the mixed material that facilitates electricity flow in a thickness direction of the fine particle layer 105 in the electron acceleration layer 4 is conductive fine particles 6.

The conductive fine particles 6 are deposited on a surface of the fine particle layer 105 to form a deposition 106. The provision of the conductive fine particles 6 on the fine particle layer 105 is realized in such a manner that the conductive fine particles 6 are deposited on the surface of the fine particle layer 105 so that the deposition 106 is formed. The deposition 106 of the conductive fine particles 6 includes a physical recess that is to be an electron emission section in the process of forming a conductive path.

Figure 2:
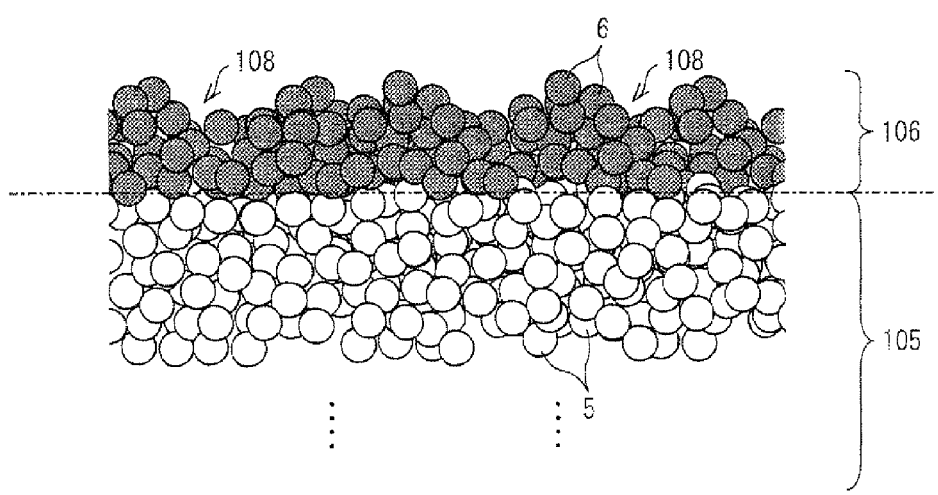
FIG. 2 is a schematic view illustrating a cross-section surface of an electron acceleration layer of the electron emitting element according to Embodiment 1 of the present invention.

FIG. 2 is a schematic view illustrating a cross-section plane of the electron acceleration layer 4 including the deposition 106 of the conductive fine particles 6. As illustrated in FIG. 2, the conductive fine particles 6 forming the deposition 6 as an upper layer in the electron acceleration layer 4 are deposited on a surface (upper face) of the fine particle layer 105 without being mixed with insulating fine particles 5 constituting the fine particle layer 105 as a bottom layer.

A method for depositing the conductive fine particles 6 without being mixed with the insulting fine particles 5 may be realized in such a manner that the conductive fine particle 6 is formed in about the same size as that of the insulating fine particle 5, or that the fine particle layer 105 is formed such that the insulating fine particles 5 are bound to each other with the use of binder resin.

Especially, in the configuration in which the fine particle layer 105 is solidified with the use of the binder resin, a particle diameter of the insulating fine particle 5 can be selected without any consideration of the problem that the conductive fine particles 6 are mixed into the fine particle layer 105, with the result that a range of choice broadens.

Further, this configuration has an advantage that mechanical strength of the electron emitting element 1 itself increases.

In the deposition 106, an electron emitting section 108 in the form of a physical recess is provided. Further, a conductive path (not shown) is provided below the electron emitting section 108. The electron emitting section 108 and the conductive path are formed by a forming process in the atmosphere.

Generally, the forming process indicates a process of forming a conductive path by applying an electric field to an MIM type electron emitting element, for example, as disclosed in Patent Literature 2. The forming process is absolutely different from general insulation breakdown, and is an accidental growth of a conductive path (current pathway) that is explained as various theories, such as (a) diffusion of an electrode material into an insulating layer, (b) crystallization of an insulating material, (c) formation of a conductive path called filament, and (d) stoichiometric distortion of an insulating material.

Such formation of the conductive path (the conductive path formed in advance) by the forming process in the atmosphere can be easily made because the deposition 106 of the conductive fine particles 6 provided on the surface of the fine particle layer 105 facilitates electricity flow in a thickness direction of the fine particle layer 105. As such, the conductive path can be easily formed by the forming process in the atmosphere.

Since the conductive path is formed in the electron acceleration layer 4 in advance, no conductive path is newly formed due to subsequent voltage application, in vacuum, to the element to emit electrons, and current in the element flows through the conductive path that is formed in advance. This allows the conductive path to stably function during electron emission.

In contrast, in a case where a voltage is applied, in vacuum, to an element in which no conductive path is formed in advance, the voltage application causes formation of a conductive path as well as electrons emission. That is, the conductive path is being formed while the electrons are being emitted. The conductive path thus formed under such a condition is not constant, and a new conductive path is formed every time when the voltage is applied to the element in vacuum. As a result, every time when the voltage is applied in vacuum, a conductive state of the element changes, thereby resulting in that a stable electron emission characteristic cannot be obtained.

As such, in the electron emitting element 1 including the electron acceleration layer 4, the electrons are emitted not from unprescribed portions in the electron acceleration layer 4 but from a specific portion, i.e., the electron emitting section in the electron acceleration layer 4. On this account, a portion, in the thin-film electrode 3, which is inversely sputtered with the emitted electrons is limited to a portion positioned right above the electron emitting section 108 and a portion positioned in the vicinity of the electron emitting section 108. Accordingly, the other portions in the thin-film electrode 3 except for the portion right above the electron emitting section 108 and the portion in the vicinity of the electron emitting section 108 are not exposed to the electrons, thereby preventing that a constituent metal material of the thin-film electrode 3 wears off over time by being sputtered with the emitted electrons and the thin-film electrode 3 finally loses its function as an electrode. As a result, the thin-film electrode 3 can maintain a function as an upper electrode for a long period.

Figure 3:
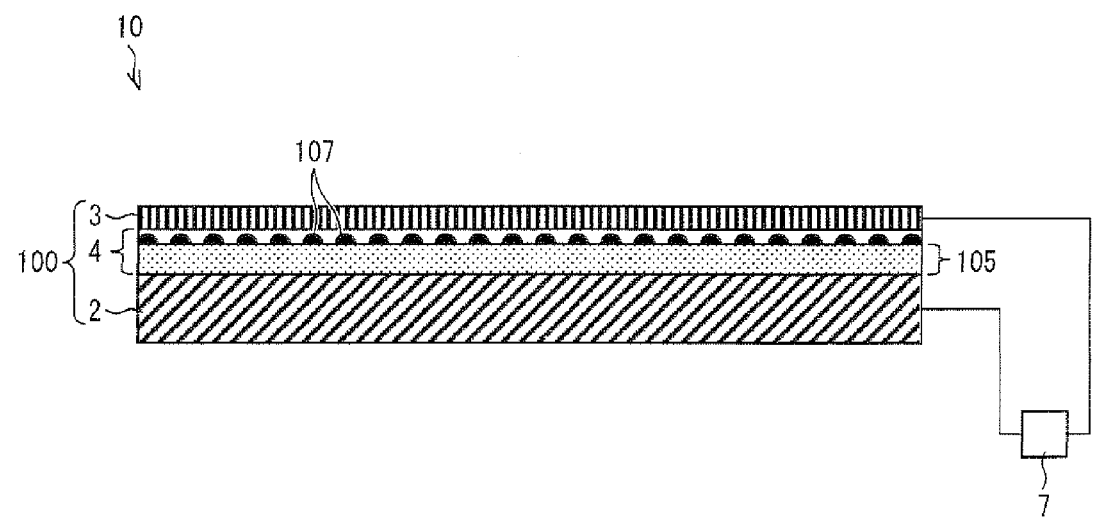
FIG. 3 is a schematic view illustrating a configuration of an electron emitting device including an electron emitting element according to Embodiment 2 of the present invention.
Figure 4:
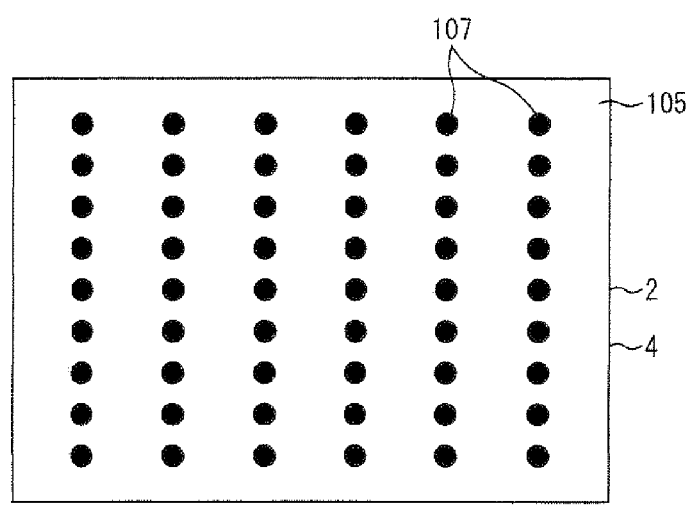
FIG. 4 is a schematic view illustrating a plane surface of an electron acceleration layer of the electron emitting element according to Embodiment 2 of the present invention.

As shown in FIGS. 1 and 2, a shape of the deposition may be a plane shape like the deposition 106 such that the conductive fine particles 6 are deposited all over the surface of the fine particle layer 105. However, it is more preferable that spotted depositions 107 in each of which the conductive fine particles 6 are deposited on the fine particle layer 105 are positioned in a discrete manner, as shown in FIGS. 3 and 4. In the following description, the configuration in which the depositions 107 are discretely positioned as such is referred to as an electron emitting element 100 according to Embodiment 2 of the present invention.

FIG. 3 illustrates the electron emitting element 100 in which a single material or a mixed material that facilitates electricity flow in a thickness direction of a fine particle layer 105 in an electron acceleration layer 4 is conductive fine particles 6 and the conductive fine particles 6 are discretely deposited on a surface of the fine particle layer 105.

FIG. 4 is a top view illustrating the electron emitting element 100 of FIG. 3. As illustrated in FIG. 4, the conductive fine particles 6 are discretely deposited on the surface of the fine particle layer 105 so as to form spotted depositions 107. The provision of the conductive fine particles 6 on the fine particle layer 105 is realized in such a manner that the conductive fine particles 6 are deposited on the surface of the fine particle layer 105 so that the spotted depositions 107 are formed. In forming of a conductive path, a physical recess similar to the aforementioned electron emitting section 108 is formed in each of the depositions 107.

Figure 5:
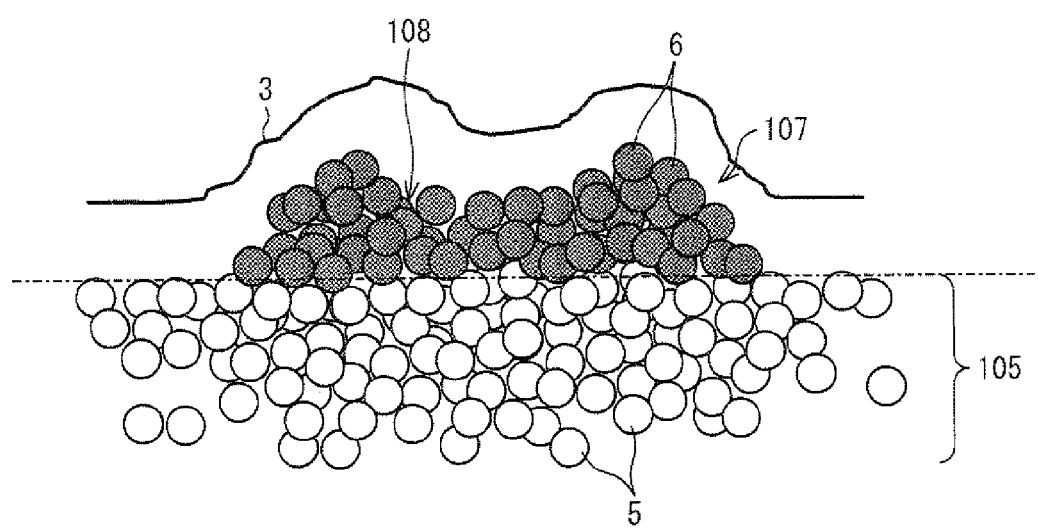
FIG. 5 is a schematic view illustrating a cross-section surface of one deposition of discretely-deposited conductive fine particles and the vicinity of the partial deposition, in the electron acceleration layer in the electron emitting element according to Embodiment 2 of the present invention.

FIG. 5 is a schematic view illustrating a cross-section plane of the electron acceleration layer 4 including the depositions 107 of the conductive fine particles 6. The depositions 107 of the conductive fine particles 6 are deposited in a dome shape on the fine particle layer 105 including insulating fine particles 5. The conductive fine particles 6 are deposited on a surface (top face) of the fine particle layer 105 without being mixed with the insulating fine particles 5 in an interface between the depositions 107 and the fine particle layer 105. A method for depositing the conductive fine particles 6 constituting the depositions 107 as an upper layer without being mixed with the insulting fine particles 5 constituting the fine particle layer 5 as a lower layer is the same as the method for forming the deposition 106 in a plane manner.

Figure 6:
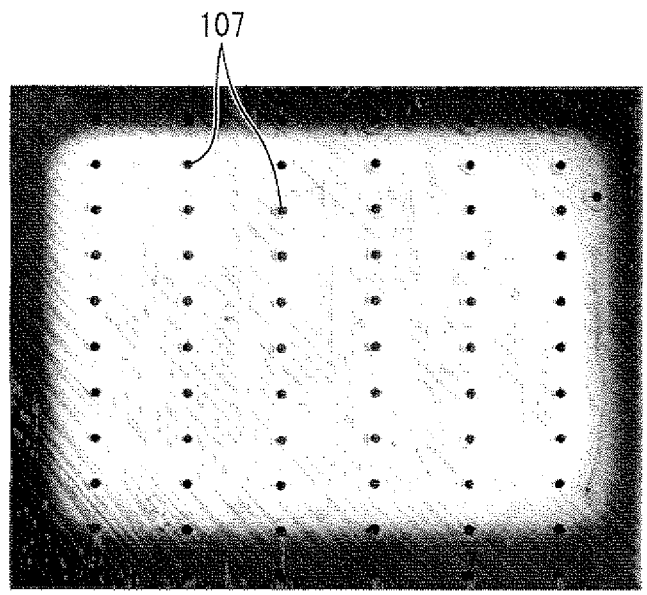
FIG. 6 is a picture of the electron emitting element according to Embodiment 2 of the present invention and shows a surface of the electron acceleration layer in which insulating fine particles are discretely deposited on a fine particle layer.

FIG. 6 is a picture of a surface of the electron emitting element 100 in which the conductive particles 6 are discretely deposited on the surface of the fine particle layer 105 by an inkjet method. An inner part surrounded by a black frame is a portion where a thin-film electrode is to be formed. The thin-film electrode 3 is uniformly deposited along uneven portions of the depositions 107 shown as black spots.

With the configuration in which the spotted depositions 107 in each of which the conductive fine particles 6 are deposited on the surface of the fine particle layer 105 are positioned in a discrete manner, it is possible to control from which positions electrons are emitted and an amount of the electrons emitted per unit area.

The following explains about the reason why the configuration in which the depositions 107 are discretely positioned is preferable.

In the forming process in the atmosphere, a conductive path (current pathway) is formed in such a manner that current flows from a side of the electrode substrate 2 toward a side of the thin-film electrode 3 to aim for a portion where current easily flows in the deposition 106 or the depositions 107 of the conductive fine particles 6. For this reason, in the deposition 106 in a plane manner, the electron emitting section 108 is accidentally formed on the surface of the deposition 106, and therefore it is not specified where the electron emitting section 108 is to be formed and how many electron emitting sections 108 are to be formed. With such a configuration in which the electron emitting section (the electron emitting section 108) is accidentally formed on the surface of the electron acceleration layer 4, it is difficult to control from which positions the electrons are emitted and the amount of the electrons emitted per unit area.

The amount of electrons emitted can be also controlled by changing a voltage to be applied between the electrode substrate 2 and the thin-film electrode 3 such that a low voltage causes a small amount of electrons emitted and a high voltage causes a large amount of electrons emitted. However, in the element disclosed in this description, the amount of electrons emitted is extremely small at a low voltage and an electron emission efficiency markedly decreases at the low voltage. On this account, such a control, by an applied voltage, of the amount of electrons emitted cannot be used in cases of extremely reducing the amount of electrons emitted.

In contrast, in the configuration as illustrated in FIG. 3 in which the conductive fine particles are deposited in a discrete manner so as to discretely dispose the spotted depositions 107, a conductive path formed by the forming process in the atmosphere is formed in each of the depositions 107 from the side of the electrode substrate 2, so that an electron emitting section 108 is formed in each of the depositions 107.

Accordingly, by controlling positions of the depositions 107, it is possible to dispose each of the electron emitting sections at a given position on the surface of the electron acceleration layer 4, thereby resulting in that positions from which the electrons are emitted in a plane of the electron emitting element 100 and the amount of the electrons emitted per unit area can be controlled. Needless to say, the arrangement of the depositions 107 is not limited to the one illustrated in FIG. 3 in which the depositions 107 are positioned in a regular manner, and the depositions 107 may be positioned in a random manner.

Since the electron emitting section is specified to the electron emitting section 108 formed in each of the depositions 107, similarly to the case of the deposition 106 provided in a plane manner, a portion, in the thin-film electrode 3, which is inversely sputtered with emitted electrons is limited to a portion positioned right above the electron emitting section 108 and a portion positioned in the vicinity of the electron emitting section 108. Accordingly, the other portions in the thin-film electrode 3 except for the portion right above the electron emitting section 108 and the portion in the vicinity of the electron emitting section 108 are not exposed to the emitted electrons. Consequently, the thin-film electrode 3 can maintain its function as an upper electrode even after being driven for a long period.

The formation of the depositions 107 thus positioned in a discrete manner is not limited to the inkjet method by use of an inject head, provided that the conductive fine particles 6 can be discretely deposited, and a spray application method using a mask, an electrostatic atomization method in which droplets of the conductive fine particles 6 can be splashed without a mask, and the like method can be used. However, application by the inkjet method is preferable in view of controllability of an application position and repeat reproduction of an application amount.

Figure 7:
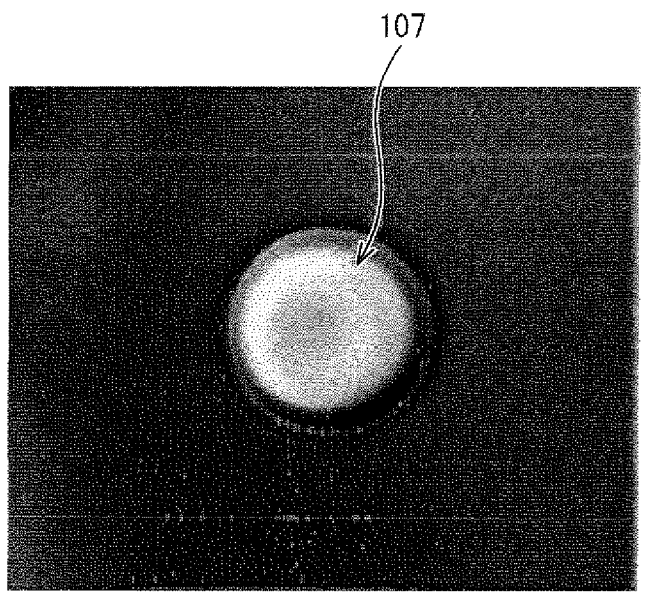
FIG. 7 is an explanatory view illustrating a state of a surface of one deposition of discretely-deposited conductive fine particles in the electron acceleration layer in the electron emitting element according to Embodiment 2 of the present invention.
Figure 8:
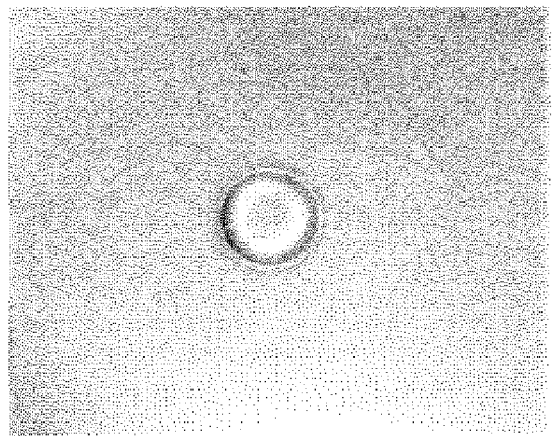
FIG. 8(a) is an enlarged view illustrating a state of a surface of one deposition of discretely-deposited conductive fine particles in the electron acceleration layer in the electron emitting element according to Embodiment 2 of the present invention.
FIG. 8(b) is an enlarged view illustrating a state of a surface of one deposition of discretely-deposited conductive fine particles in the electron acceleration layer in the electron emitting element according to Embodiment 2 of the present invention.
FIG. 8(c) is an enlarged view illustrating a state of a surface of one deposition of discretely-deposited conductive fine particles in the electron acceleration layer in the electron emitting element according to Embodiment 2 of the present invention.
Figure 8:
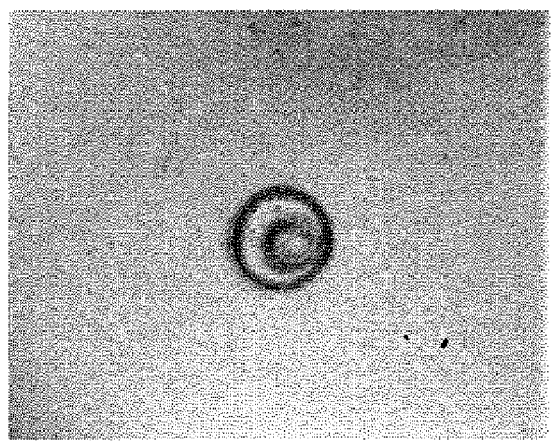
Figure 8:
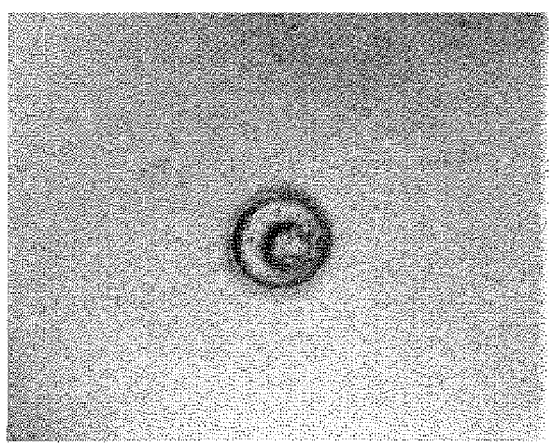

FIG. 7 is a picture of a surface of one of the spotted depositions 107. This is formed by the inkjet method. The spotted deposition 107 formed in a dome shape by the inkjet method causes a so-called coffee ring phenomenon in a drying process, so that the deposition 107 cures such that a center portion in a circle of the deposition 107 is concaved and a peripheral ring rises to a certain degree. The picture of FIG. 7 is taken before the deposition 107 is subjected to the forming process, therefore the electron emitting section 108 is not formed.

In the electron emitting element 100 in which portions to which the single material or the mixed material is applied are arranged in a discrete manner when viewed from a top face of the fine particle layer 105, as illustrate in FIG. 3, it is more preferable that a total area of the portions to which the single material or the mixed material is applied be not less than 5% but not more than 90.6% with respect to a surface area of the fine particle layer 105 and the thin-film electrode 3 have a thickness of not less than 100 nm but not more than 500 nm.

With the configuration, it is possible to avoid such a problem that a portion except for the electron emitting sections in the electron acceleration layer is selectively broken during consecutive driving. Further, with the configuration, since electron emission through the thin-film electrode is not interfered, it is possible to avoid such a problem that the portions to which the single material or the mixed material is applied, or those portions and the thin-film electrode provided on the portions are broken during the consecutive driving. The following explains about the configuration in terms of these problems in detail.

In the configuration in which electrons are emitted from the electron emitting section 108 that is provided in each of the depositions 107 arranged in a discrete manner, in order that the electron emitting element 100 stably operates for a long period, the number of electron emitting sections with respect to the surface area of the thin-film electrode 3 and the thickness of the thin-film electrode 3 are important.

That is, in a case where the number of electron emitting sections is small with respect to the surface area of the thin-film electrode 3, a portion except for the electron emitting sections in the electron acceleration layer, that is, a part of the fine particle layer 105 on which the depositions 107 of the conductive fine particles 6 are not provided and a part of the thin-film electrode 3 positioned above that part of the fine particle layer 105 are easily broken in a selective manner during the consecutive driving (long-period driving). This causes that conduction on a surface of the fine particle layer 105 is decreased along with the consecutive driving, thereby resulting in that electron emission finally stops. Such a phenomenon is caused presumably due to occurrence of insulation breakdown of the fine particle layer 105 that is caused such that the part of the fine particle layer 105 except for the electron emitting sections is broken so that a very small amount of current flows into a part where current does not flow under normal conditions, and an electrical charge is accumulated by carrying out the consecutive driving many times.

Further, even in a case where a sufficient number of electron emitting sections are provided with respect to the surface area of the thin-film electrode 3, it is found that in a case where the thickness of the thin-film electrode 3 is not enough, the depositions 107 are broken even at a low applied voltage, thereby causing the electron emission to stop.

In view of these problems, it is preferable that the electron emitting element 100 in which the portions to which the single material or the mixed material is applied are arranged in a discrete manner when viewed from a top face of the fine particle layer 105 be configured such that a total surface area of the depositions 107 is not less than 5% but not more than 90.6% with respect to the surface area of the fine particle layer 105 and the thin-film electrode 3 has a thickness of not less than 100 nm but not more than 500 nm.

In a case where the total surface area of the depositions 107 is not less than 5% with respect to the surface area of the fine particle layer 105, it is possible to avoid the problem that the part except for the electron emitting section in the electron acceleration layer 4 is selectively broken during long-time driving (consecutive driving). The reason why the upper limit is set 90.6% is as follows. That is, if the total surface area of the depositions 107 is over the upper limit, the depositions 107 are positioned so closely to each other so that the depositions 107 are arranged like in a plane manner, that is, the depositions 107 cannot be positioned in a discrete manner.

The electron emitting element 1 according to Embodiment 1 including the deposition 106 provided in a plane manner may cause an inordinate increase of electron emitting sections in an aging process. If the electron emitting sections increases inordinately, the element may be broken because the element cannot endure an increase of current in the element along with the inordinate increase of the electron emitting sections, thereby causing the electron emission to stop at short times.

Further, in a case where the thin-film electrode 3 has a thickness of not less than 100 nm, it is possible to avoid a problem such as breaking of the depositions 107 or both of the depositions 107 and the thin-film electrode 3 provided on the depositions 107 during the consecutive driving. If the thickness of the thin-film electrode 3 is less than 100 nm, an electrode film is easily broken during the consecutive driving, which may cause poor conduction. The reason why the upper limit of the thickness is 500 nm is as follows. That is, if the thickness of the thin-film electrode 3 is over the limit, the forming process in the atmosphere requires a higher voltage, which may decrease controllability of the forming process, and further permeability of gas molecules of the thin-film electrode 3 that separates the depositions 107 from the atmosphere may be decreased so that the forming process cannot be carried out, thereby resulting in that the electrons may not be emitted.

Further, it is preferable that the lower limit of the total surface area of the depositions 107 is not less than 10% with respect to the surface area of the fine particle layer 105. This makes it possible to surely avoid such a problem that the part except for the electron emitting sections in the electron acceleration layer is selectively broken during the consecutive driving.

Similarly, it is preferable that the lower limit of the thickness of the thin-film electrode 3 is not less than 160 nm. This makes it possible to surely avoid such a problem that the depositions 107 or both of the depositions 107 and the thin-film electrode 3 provided on the depositions 107 is/are broken during the consecutive driving.

The aforementioned description dealt with the conductive fine particles 6 as the single material or the mixed material that facilitates the electricity flow in a thickness direction of the fine particle layer 105 in the electron acceleration layer 4. However, as another example, such an arrangement is also possible that a basic dispersant into which an electron donor that donates a pair of electrons is introduced as a substituent is applied to the fine particle layer 105.

By applying a basic solution containing the basic dispersant to the fine particle layer 105, it is possible to provide a specific substituent (for example, a pi electron system, such as a phenyl group or a vinyl group, an alkyl group, an amino group, or the like), represented by an electron donating substituent contained in the basic solution, onto particle surfaces of the insulating fine particles 5 of the fine particle layer 105. Providing the surfaces of the insulating fine particles 5 with such a specific substituent makes it possible not only to facilitate electrical conduction on the particle surfaces through the specific substituent, but also to further facilitate this electric conductive phenomenon due to surface adhesion of water molecules or oxygen molecules in the atmosphere an atmospheric condition that the forming process is carried out in the atmosphere. As a result, similarly to the deposition 106 or the depositions 107 made of the conductive fine particles 6, it is possible to form a constant conductive path in the fine particle layer 105 by the forming process in the atmosphere. In the case where the basic solution containing the basic dispersant is applied, the basic solution may be applied in a plane manner or may be partially applied, similarly to the case of the conductive fine particles 6. In the case of the basic solution, differently from the conductive fine particles 6, the basic solution does not stay on the surface of the fine particle layer 105, but is diffused inside the fine particle layer 105. In a case where the basic solution is applied in a discrete manner, portions into which the basic solution is diffused are positioned discretely.

Examples of commercially available products of the basic dispersant that can be applied to the present invention encompass: products manufactured by Avecia K.K. (SOLSPERSE disperses, such as SOLSPERSE 9000, 13240, 13940, 20000, 24000, 24000GR, 24000SC, 26000, 28000, 32550, 34750, 31845, and the like); products manufactured by BYK chemie (DISPERBYK 106, 112, 116, 142, 161, 162, 163, 164, 165, 166, 181, 182, 183, 184, 185, 191, 2000, 2001); products manufactured by Ajinomoto Fine-Techno Co., Inc. (AJISPER PB711, PB411, PB111, PB821, PB822); and products manufactured by EFKA chemicals (EFKA-47, 4050).

Further, in the case of the basic solution, the basic solution does not stays on the surface of the fine particle layer 105, but is diffused inside the fine particle layer 105. For this reason, in a case where the fine particle layer 105 to which the basic solution is applied is subjected to the forming process in the atmosphere so as to form a conductive path, an electron emitting section formed of a physical recess is not formed unlike the deposition 106 or the depositions 107 made of the conductive fine particles 6, but just an exit of the conductive path serves as an electron emitting section. Therefore, in order to protect the electron emitting section and to realize long-period driving, it is necessary to rigidly form the electron emitting section like the deposition 106 or the depositions 107 made of the conductive fine particles 6. On this account, it is preferable to adopt a method for forming the electron emitting section in such a manner that a solid material that cures the electron emitting section is mixed in the basic solution, and the basic solution is applied so that the electron emitting section is formed in a deposition of the solid material, like the deposition 106 or the depositions 107 made of the conductive fine particles 6.

Next will be described about each section in the electron emitting element 1, 100.

In addition to a function as an electrode, the electrode substrate 2 also acts as a supporting member of the electron emitting element. Accordingly, the substrate 2 is not specifically limited in material as long as the material has a sufficient strength, excellent adhesiveness with respect to a substance in direct contact with the material, and sufficient electrical conductivity. Examples of the substrate include: metal substrates made of, for example, SUS, Ti, and Cu; and semiconductor substrates made of, for example, Si, Ge, and GaAs.

In cases where an insulator substrate such as a glass substrate or a plastic substrate is used, an electrically conductive material such as metal may be attached, as an electrode, to a surface thereof (an interface of the insulator substrate and the electron acceleration layer 4). A constituent material of the electrically conductive material to be attached to the surface of the insulator substrate is not specifically limited as long as a thin film of a material excellent in electrical conductivity can be formed by magnetron sputtering or the like. Note that, if steady operation of the electron emitting element in the atmosphere is desired, a conductor having high resistance to oxidation is preferably used and noble metal is more preferably used as the constituent material. An ITO thin-film which is widely used as an electrically conductive oxide material for a transparent electrode is also applicable. Alternatively, it is possible to use a metal thin film obtained by first forming a Ti film of 200 nm on a surface of a glass substrate and then forming a Cu film of 1000 nm on the Ti film, because a strong thin film can be formed. In this case, materials and values are not specifically limited to those described above.

The thin-film electrode 3 is for applying a voltage in the electron acceleration layer 4. Accordingly, a material of the thin-film electrode 3 is not specifically limited as long as the material makes it possible to apply a voltage. Examples of such a material include: gold, silver, carbon, tungsten, titanium, aluminum, and palladium each of which has a work function in a range of 4 eV to 5 eV. Among these materials, in particular, in consideration of an operation under an atmospheric pressure, the best material is gold which is free from oxide or sulfide formation reaction. Further, silver, palladium, or tungsten each of which has a relatively small oxide formation reaction is also applicable material that can be used without any problem.

The thickness of the thin-film electrode 3 is preferably not less than 100 nm but not more than 500 nm. By arranging the thickness of the thin-film electrode 3 to be not less than 100 nm, it is possible to avoid such a problem that the depositions 107, or the depositions 107 and the thin-film electrode 3 provided on the depositions 107 are broken during consecutive driving. In a case where the thickness is less than 100 nm, an electrode film is easily broken during the consecutive driving, thereby causing poor electric conduction. The upper limit of the thickness is 500 nm because, in a case of a thickness of more than 500 nm, (i) a higher voltage is required for the forming process in the atmosphere, which may cause lack of controllability, and (ii) the thin-film electrode 3 that separates the depositions 107 from the atmosphere may lose its gas molecule permeation, thereby resulting in that the forming process cannot be carried out, that is, electrons may not be emitted.

A practically used material of the insulating fine particles 5 included in the fine particle layer 105 in the electron acceleration layer 4 may be, for example, $SiO_2$, $Al_2O_3$, and $TiO_2$. However, in a case where surface-treated silica particles having a small diameter are used, a surface area of the surface-treated silica particles in a solvent is increased and solution viscosity increases as compared to a case where spherical silica particles having a particle diameter larger than that of the surface-treated silica particles having a small diameter are used. As a result, a thickness of the electron acceleration layer 4 tends to increase slightly. Further, fine particles made of an organic polymer can be used as the material of the insulating fine particles 5.

Particles that may be used as the insulating fine particles 5 encompass (i) two or more different kinds of particles, (ii) particles having different peaks in diameter, or (iii) one kind of particles whose distribution of diameters is broad.

As mentioned above, the conductive fine particles 6 are deposited on the fine particle layer 105 so as to form the deposition 106 or the depositions 107. The particles may be slightly mixed with each other in an interface between the deposition 106 or the depositions 107 and the fine particle layer 105, but both layers should be separated. On this account, the particle diameter of the insulating fine particle 5 should be selected depending on the particle diameter of the conductive fine particle 6 so that the mixture is not caused.

Note however that, in a case where binder resin to bond the insulating fine particles 5 to one another is used, the binder resin prevents that the conductive fine particles 6 come into the insulating fine particles 5. Accordingly, the particle diameter of the insulating fine particle 5 can be more flexibly selected to some extent, as compared to the cases where the binder resin is not used.

Further, it is preferable that the fine particle layer 105 have a sufficient thickness so that the fine particle layer 105 absorbs a solvent used for applying the conductive fine particles 6 and the solvent is diffused in the fine particle layer 105. This is because, as described later, in order to produce a preferable electron emitting element, it is preferable to additionally apply a basic solution all over the surface of the electron acceleration layer 4 in which the conductive fine particles 6 are deposited on the fine particle layer 105. In a case where the basic solution is applied before the deposition 106 or the depositions 107 in the electron acceleration layer 4 is/are fully solidified, the conductive fine particles 6 constituting the deposition 106 or the depositions 107 run out into the basic solution. In view of this, the deposition 106 or the depositions 107 should be fully solidified when the basic solution is applied. In order to fully solidify the deposition 106 or the depositions 107, it is necessary that the solvent used for applying the conductive fine particles 6 be absorbed and diffused in the fine particle layer 105. For this reason, it is a necessary requirement for the fine particle layer 105 to have sufficient gaps to absorb the solvent and to have a sufficient thickness to absorb and diffuse the solvent therein. This point is also important for the case where the basic solution containing a basic dispersant is used as the single material or the mixed material that facilitates the electricity flow in a thickness direction of the fine particle layer and a solid material is mixed in the basic solution.

As a constituent material of the conductive fine particles 6 of the deposition 106 or the depositions 107, any conductor can be used from the viewpoint of the operation principle of generating ballistic electrons. A conductor having high resistance to oxidation can avoid deterioration of the conductive fine particles 6 due to oxidation and allow long-term use. The high resistance to oxidation indicates that an oxide formation reaction is low. In general, according to a thermodynamic calculation, when a value of a change $\Delta G$ [kJ/mol] in free energy of oxide formation is negative and greater, the oxide formation reaction occurs more easily. Such a conductor having high resistance to oxidation may be, for example, gold, silver, platinum, palladium, nickel, or the like material.

The conductive fine particles 6 can be produced by using a known fine particle production method such as a sputtering method or a spray heating method. It is also possible to use commercially available metal fine particle powder such as silver nanoparticles manufactured and marketed by Ouyou Nano Particle Laboratory K.K.

A diameter of the conductive fine particle 6 should have a size that is not easily broken due to breaking of the deposition 106 or the depositions 107 caused by electron irradiation, especially due to inverse sputtering. In examinations, it is demonstrated that if an average particle of the conductive fine particles 6 is 5 nm, the inverse sputtering can be prevented. The deposition of the conductive fine particles 6 having such a size (weight) can restrain breaking of itself due to emitted electrons.

Note that a conductive fine particle 6 may be surrounded by a small insulating material that is an insulating material whose size is smaller than the average particle diameter of the conductive fine particle 6. This small insulating material can be an adhering substance which adheres to a surface of the conductive fine particle 6. Further, the adhering substance may be an insulating coating film that coats the surface of the conductive fine particle 6 and that is made as an aggregate of particles whose average particle diameter is smaller than that of the conductive fine particle 6. In view of the operation principle for generating ballistic electrons, any insulating material can be used as the small insulating material. However, in a case where the insulating material whose size is smaller than that of the conductive fine particle 6 is the insulating coating film coating the surface of the conductive fine particle 6 and an oxide film of the conductive fine particle 6 is used as the insulating coating film, a thickness of the oxide film may be increased to a thickness larger than a desired thickness due to oxidation degradation in the atmosphere. For the purpose of preventing the oxidation degradation at the time of an operation under the atmospheric pressure, the insulating coating film is preferably made of an organic material. Examples of the organic material include: alcoholate, aliphatic acid, and alkanethiol. A thinner insulating coating film is more advantageous.

Further, the binder resin used in the fine particle layer 105 should be a material which has excellent adhesiveness with respect to the electrode substrate 2, in which the insulating fine particles 5 can be dispersed, and which has an insulation property. As has been already described, it is necessary not to prevent that the fine particle layer 105 absorbs the solvent used for applying the conductive fine particles 6. On this account, it is also necessary that the binder resin does not prevent absorption and diffusion of the solvent used for applying the conductive fine particles 6.

The binder component 15 may be such as: tetramethoxysilane, tetraethoxysilane, methyltrimethoxysilane, methyltriethoxysilane, phenyltriethoxysilane, hexyltrimethoxysilane, decyltrimethoxysilane, hydrolysable group-containing siloxane, vinyltrimethoxysilane, vinyltriethoxysilane, 2-(3,4epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropyltrimethoxysilane, 3-methacryloxypropylethoxysilane, 3-acryloxypropyltrimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, 3-ureidopropyltriethoxysilane, 3-chloropropyltrimethoxysilane, 3-mercaptopropyltrimethoxysilane, bis(triethoxysilylpropyl)tetrasulfide, and 3-isocyanatepropyltriethoxysilane. The above binder resins can be used solely or in combination of two or more kinds.

The following explains about one embodiment of a production method of the electron emitting device 1, 100.

Initially, a dispersant and the insulating fine particles 5 are poured into a dispersion solvent, and the dispersion solvent is set in an ultrasonic dispersion device so that the insulating fine particles 5 are dispersed in the solvent, so as to prepare an insulating fine particle dispersion solution A. A dispersing method thereof is not limited in any particular manner, and the insulating fine particles 5 may be dispersed by a method other than the method using the ultrasonic dispersion device. The dispersion solvent in which the insulating fine particles 5 are to be dispersed is not particularly limited provided that the dispersion solvent allows the insulating fine particles 5 to be effectively dispersed therein and evaporates after the dispersion solvent is applied. For example, toluene, benzene, xylene, hexane, tetradecane, and the like can be used. The dispersant is also not limited provided that the dispersant is compatible with the dispersion solvent and is capable of dispersing the insulating fine particles 5.

The insulating fine particle dispersion solution A thus prepared is applied on an electrode substrate 2, so as to form a fine particle layer 105 constituting an electron acceleration layer 4. An application method thereof may be, for example, a spin-coating method. That is, the insulating fine particle dispersion solution A is dropped onto the electrode substrate 2 and forms a thin film as the fine particle layer 105 by use of the spin-coating method. The successive processes of dropping the insulating fine particle dispersion solution A, forming a film by the spin-coating method, and drying the film are repeatedly carried out several times so as to form a film having a predetermined thickness. The formation of the fine particle layer 105 can be also carried out by a drop method, a spray-coating method, or the like, besides the spin-coating method.

Then, a dispersant and conductive fine particles 6 are poured in a dispersion solvent, and the dispersion solvent is set in the ultrasonic dispersion device so that the conductive fine particles 6 are dispersed in the solvent, so as to prepare a conductive fine particle dispersion solution B. A dispersing method thereof is not limited in any particular manner, and the conductive fine particles 6 may be dispersed by a method other than the method using the ultrasonic dispersion device. The dispersion solvent in which the conductive fine particles 6 are to be dispersed is not particularly limited provided that the dispersion solvent allows the conductive fine particles 6 to be effectively dispersed therein and evaporates after the dispersion solvent is applied. For example, toluene, benzene, xylene, hexane, tetradecane, and the like can be used. The dispersant is also not limited provided that the dispersant is compatible with the dispersion solvent and is capable of dispersing the conductive fine particles 6.

As the conductive fine particle dispersion solution B, a commercially-available conductive fine particle dispersion solution in which the conductive fine particles 6 are dispersed in the dispersion solvent may be also used. Note however that there are some limits in viscosity of an application solution depending on which application method is used. In view of this, a commercially-available conductive fine particle dispersion solution may be used provided that the viscosity thereof is within the limits.

The conductive fine particle dispersion solution B thus prepared is applied to a surface of the fine particle layer so that the conductive fine particles 6 are deposited on the surface of the fine particle layer 105, so as to form a deposition 106 or depositions 107. An application method thereof may be, for example, a spin-coating method, an inkjet method, a drop method, a spray method, or the like. In a case where the conductive fine particles 6 are deposited in a discrete manner so as to form the depositions 107, the inkjet method is most preferable. However, a spray application method using a mask, an electrostatic atomization method in which droplets of the conductive fine particles 6 can be splashed without a mask, and the like method may be also used.

After the electron acceleration layer 4 constituted by the fine particle layer 105 and the deposition 106 or the depositions 107 provided thereon is formed as such, a thin-film electrode 3 is formed on the electron acceleration layer 4. The thin-film electrode 3 may be formed, for example, by magnetron sputtering. Other than the magnetron sputtering, the thin-film electrode 3 can be formed, for example, by an inkjet method, a spin-coating method, a vapor deposition method, or the like.

Subsequently, a forming process of forming a conductive path is carried out in such a manner that a direct voltage is applied between the electrode substrate 2 and the thin-film electrode 3 in the atmosphere so that the deposition 106 or the depositions 107 is/are partially broken to form a conductive path. This forms an electron emitting section 108 in the deposition 106 or the depositions 107, thereby forming the conductive path in the fine particle layer 105.

In the forming process, it is preferable that the direct voltage applied between the electrode substrate 2 and the thin-film electrode 3 be increased in a stepwise manner. This is because sudden application of a voltage for causing a necessary electric field between the electrode substrate 2 and the thin-film electrode 3 may cause insulation breakdown in an element. By increasing the voltage in a stepwise manner, it is possible to carry out the forming process without causing the insulation breakdown.

Further, in the forming process, the voltage applied between the electrode substrate 2 and the thin-film electrode 3 is preferably set such that an electric field intensity generated between the electrode substrate 2 and the thin-film electrode 3 is $1.9 \times 10^7$ to $4.1 \times 10^7$ [V/m]. In a case where the electric field intensity is less than $1.9 \times 10^7$ [V/m], the forming process cannot be carried out, or even if the forming process is carried out, the conductive path is insufficiently formed. In this case, even if a voltage necessary for electron emission is applied, current in the element is not sufficient for causing electron emission. Further, in a case where the electric field intensity is more than $4.1 \times 10^7$ [V/], large insulation breakdown may be easily caused, thereby resulting in that the conductive path itself is broken. Once this happens, even in a case where a voltage necessary for electron emission is applied, current in the element does not flow at all, or even if the current flows, an amount of the current is not sufficient for causing electron emission.

In producing the electron emitting element 1, 100 of the present invention, it is more preferable that the aforementioned basic solution containing a basic dispersant as a single material or a mixed material except for the conductive fine particles 6, which single or mixed material facilitates electricity flow in a thickness direction of the fine particle layer 105 in the electron acceleration layer 4, be applied all over a surface of the electron acceleration layer 4 constituted by the fine particle layer 105 and the deposition 106 or the depositions 107 provided on the fine particle layer 105, and then the thin-film electrode 3 be formed thereon.

The deposition 106 or the depositions 107 is/are formed such that the conductive fine particles 6 are deposited on a top face of the fine particle layer 105, and therefore density of the conductive fine particles 6 is high. On the other hand, in the fine particle layer 105, although a part of the conductive fine particles 6 penetrates into the fine particle layer 105 in the vicinity of an interface between the fine particle layer 105 and the deposition(s), the percentage of the conductive fine particles 6 is very low. For this reason, in such an electron acceleration layer 4, it is not easy to form a conductive path even if the direct voltage is applied in the forming process.

However, in view of this, it is demonstrated that, by applying the basic solution to the electron acceleration layer 4, an electron emitting section 108 can be formed with high reproduction and small energy under moderate process conditions, thereby allowing forming of a conductive path.

As has been described above, by applying the basic solution to the fine particle layer 105 on which the deposition 106 or the depositions 107 is/are applied, electrical conduction on particle surfaces is facilitated. Moreover, because of an atmospheric condition that the forming process is carried out in the atmosphere, the application of the basic solution causes surface adhesion of water molecules or oxide molecules in the atmosphere, thereby further facilitating the electrical conduction phenomenon. As a result, the forming process can be easily and surely carried out.

A method of applying the basic solution is not limited provided that a subtle amount of the solution can be uniformly applied without breaking the electron acceleration layer 4 in which the deposition 106 or the depositions 107 are provided on the surface of the fine particle layer 105. The method may be, for example, a spin-coating method, a drop method, or the like.

Further, in terms of a procedure of applying the basic solution, the basic solution can be also applied to the fine particle layer 105 onto which the deposition 106 or the depositions 107 has/have not been formed yet. However, the applicants of the present invention consider that the procedure in which the deposition 106 or the depositions 107 is/are initially formed and then the basic solution is applied thereto allows easier formation of the conductive path in the forming process.

The reason is as follows. FIG. 8(a) through FIG. 8(c) are surface pictures of the deposition 107 that is formed by depositing the conductive fine particles 6 in a discrete manner. FIG. 8(a) shows a surface of the deposition 107 that is not coated with the basic solution (before the forming process). It is observed that a circle black line is formed around an edge section. FIG. 8(b) shows the surface of the deposition 107 that is just coated with the basic solution (before the forming process), focusing on the edge section. As compared with FIG. 8(a), it is found that a second circle black line is newly formed inside the edge section. FIG. 8(c) shows the surface of the deposition 107 that is just coated with the basic solution (before the forming process), focusing on a ring section that rises the most. As compared with FIG. 8(a), it is found that a scar or the like mark is formed on a part of the ring section thus rising the most and a pool of a blue substance is formed in a recess section at the center.

As a result of these observations, the applicants of the present invention consider that application of the basic solution carried out after depositing the deposition 106 or the depositions 107 allows forming of a scar on the surface of the deposition 106 or the depositions 107 so that current flows toward the scar on the surface in the subsequently carried out forming process, thereby making it easy to form the conductive path.

EXAMPLES

Example 1

Into a 10-mL reagent bottle, 2.0 g of an ethanol solvent and 0.5 g of tetramethoxysilane KBM-04 (manufactured by Shin-Etsu Chemical Co., Ltd.) were added. Further, as insulating fine particles 5, 0.5 g of spherical silica particles AEROSIL R8200 (manufactured by Evonik Degussa Japan Co., Ltd.) having an average diameter of 12 nm were added to the reagent bottle, and the reagent bottle was set in an ultrasonic dispersion device, so as to obtain an insulating fine particle dispersion solution A.

Then, the insulating fine particle dispersion solution A was dropped onto a 25 mm-square glass substrate having an ITO thin film on its surface, as the electrode substrate 2, and the glass substrate was subjected to spin-coating at 8000 rpm and 10 s so as to form a silica particle layer as the fine particle layer 105. Then, the glass substrate was dried at a room temperature for a few hours.

Subsequently, a tetradecane dispersion solution (manufactured by ULVAC, Inc., an average diameter of silver fine particles: 5.0 nm, solid density of the silver fine particles: 54%) in which silver nanoparticles were dispersed as the conductive fine particles 6 was discretely discharged onto a surface of the silica particle layer by use of a so-called inkjet head, so as to form silver-particle domes, which were droplet depositions as the depositions 107, in such a manner that a diameter of landing droplets was 26 μm and density was about 5500 pieces per square centimeter. At this point, a discharge condition of the inkjet head was such that discharge volume was 4 pL and discharge pitch was one droplet in a 135 μm square.

Then, into a 10-mL reagent bottle, 3 mL of a toluene solvent was poured, and then 0.03 g of AJISPER PB821 (manufactured by Ajinomoto Fine-Techno Co., Inc.), which is a basic dispersant (a copolymeric compound containing a basic functional group), was added thereto. The reagent bottle was then set in the ultrasonic dispersion device so that the basic dispersant was dispersed in the solvent, so as to obtain a basic solution. The basic solution thus obtained was dropped onto the silica particle layer having a number of silver-particle domes, of the glass substrate, and the glass substrate was subjected to spin-coating at 1000 rpm and 10 s so that the basic solution was applied to the silica particle layer.

Finally, a surface electrode was formed, as the thin-film electrode 3, on the surface of the silica particle layer having a number of silver-particle domes by use of a magnetron sputtering device, so as to obtain an electron emitting element of Sample #1. Gold was used as a material of the surface electrode, the surface electrode had a thickness of 40 nm and an area of 0.014 cm$^2$.

Figure 9:
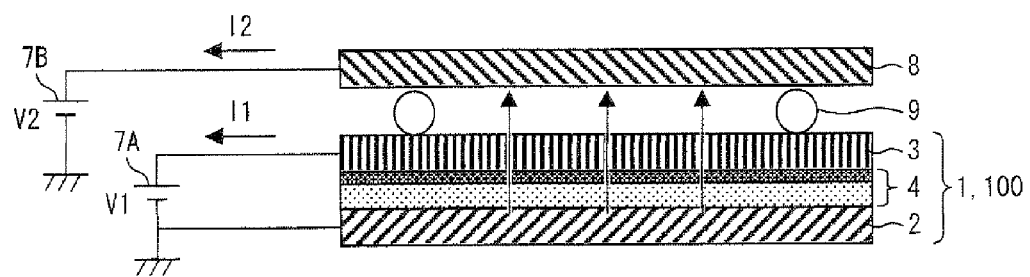
FIG. 9 is a diagram illustrating a measurement system of an electron emission experiment carried out with respect to an electron emitting element.

With the use of a measurement system as shown in FIG. 9, an electron emitting experiment was carried out with respect to the electron emitting element of Sample #1 in vacuum and in the atmosphere, so as to examine an electron emission characteristic of the electron emitting element of Sample #1.

Initially, FIG. 9 shows a measurement system used for the electron emission experiment. The measurement system in FIG. 9 is such that a counter electrode 8 is disposed on a side of the thin-film electrode 3 of the electron emitting element (1, 100) with insulating spacers (diameter: 1 mm) sandwiched between the thin-film electrode 3 and the counter electrode 8. A voltage V1 is to be applied, from a power supply 7A, between the electrode substrate 2 and the thin-film electrode 3 of the electron emitting element of Sample #1, while a voltage V2 is to be applied, from a power supply 7B, to the counter electrode 8. Current I1 in the element (current density in the element) per unit area, which flowed between the thin-film electrode 3 and the power supply 7A, was measured in such a manner that the measurement system was placed in vacuum of 1×10$^{-8}$ ATM and in the atmosphere.

Figure 10:
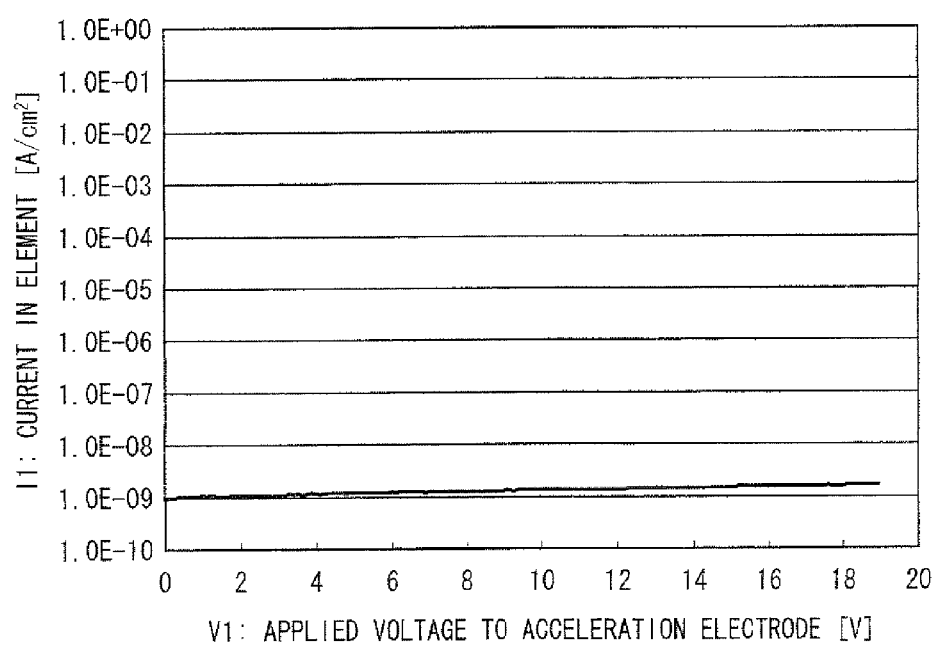
FIG. 10 illustrates a measurement result of current in an electron emitting element of Sample #1 while a voltage is applied to the electron emitting element in vacuum in a stepwise manner.

FIG. 10 shows a result of measuring the current I1 in the element while a direct voltage was being applied to the electron emitting element of Sample #1 in vacuum in such a manner that the direct voltage was increased at a step of 0.1 V in a range from 0 to +19 V (the direct voltage rose by 0.1 V). As shown in FIG. 10, in the range of the voltage from 0 to +19 V, the current I1 in the element was not more than 1×10$^{-7}$ A/cm$^2$. When the current I1 in the element was as such, the electron emitting element was almost in an insulating state. That is, it was demonstrated that the electron emitting element of Sample #1 did not have a function as an electron emitting element.

Figure 11:
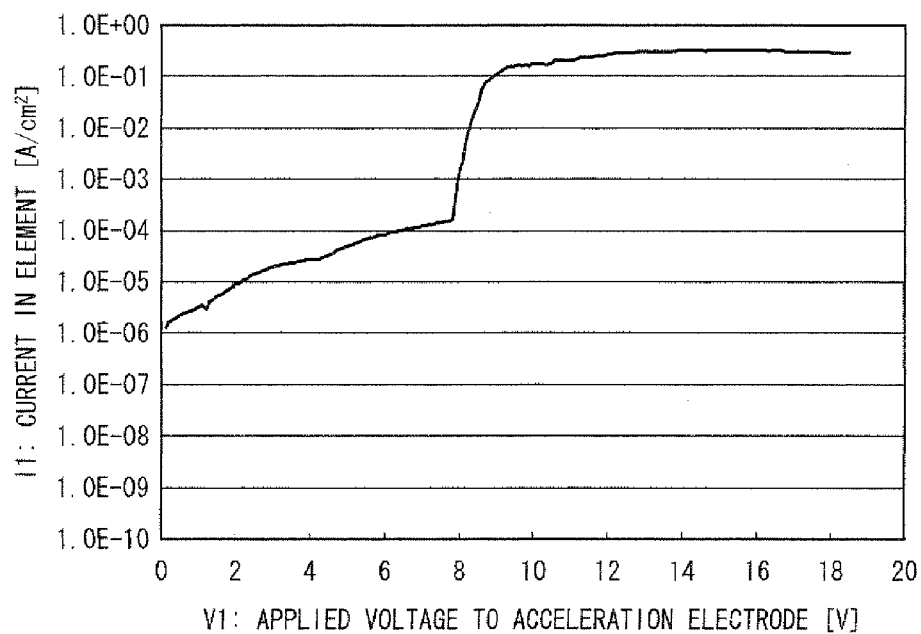
FIG. 11 illustrates a measurement result of current in the electron emitting element of Sample #1 while a voltage is applied to the electron emitting element in the atmosphere in a stepwise manner.

FIG. 11 shows a result of measuring the current I1 in the element while the direct voltage was being applied to the electron emitting element of Sample #1 in the atmosphere in such a manner that the direct voltage was increased at a step of 0.1 V in a range from 0 to +19 V (the direct voltage rose by 0.1 V). In this case, the voltage was increased at a speed of 1 V/3 sec. Further, such a voltage application process in the atmosphere was carried out only once.

As shown in FIG. 11, in comparison with the case in vacuum, hundredfold current flowed in the element immediately after the voltage was applied. It was demonstrated that the current significantly increased nonlinearly, especially, at around +9 V. After the significant increase of the current, the change in the current value became small as the voltage increased, and finally, the current value leveled off at around the last value (around +18.5 V).

While the current is flowing in such a manner, a light emitting phenomenon, which is observable by eyes, occurs in the silver-particle dome on the surface of the element, thereby causing a crack or a split in a part of the dome in return for the phenomenon. Such a recess caused in the silver-particle dome becomes a conductive path when a voltage is applied again. In this regard, it is considered that this voltage application process in the atmosphere develops a conductive-path forming mechanism similar to the so-called "forming process" in which a conductive path is formed by applying an electric filed to a general MIM type electron emitting element. Hereinafter, this conductive-path forming process is referred to as an atmospheric forming process.

The electron emitting element of Sample #1 that had been subjected to the atmospheric forming process was placed in the measurement system of FIG. 9 in vacuum (1×10$^{-8}$ ATM) so that its electron emission characteristic was examined. Here, the current I1 in the element and electron emission current I2, each per unit area, were measured. The electron emission current I2 measured here was current I2 flowing between the counter electrode 8 and the power supply 7B.

Figure 12:
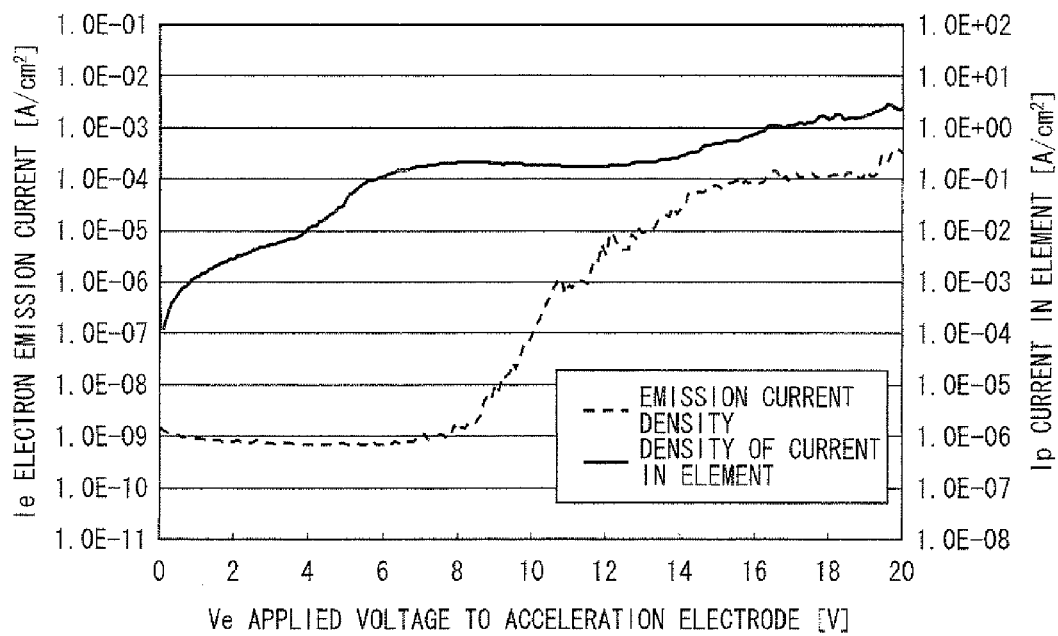
FIG. 12 illustrates a measurement result of current in the electron emitting element of Sample #1 in vacuum that has been subjected to stepwise voltage application (forming process) in the atmosphere.

A result of the measurements is shown in FIG. 12. Electron emission obtained here was 4.02×10$^{-4}$ [A/cm$^2$] per unit area at 19.8 V of the applied voltage to the thin-film electrode 3. The electron emitting section was formed only in the silver-particle dome section. On this account, electron emission density per silver-particle dome in the present example is 1.38×10$^{-2}$ [A/cm$^2$].

Example 2

As Example 2, an electron emitting element of Sample #2 was formed almost in the same procedure as in Example 1, except that the basic solution was not applied to the silica particle layer having a number of silver-particle domes. In Example 2, in the atmospheric forming process, a crack or a split could be formed in a silver-particle dome and electron emission in vacuum could be observed. However, it was difficult to control current flowing in the element and to control a degree of the crack or the split formed in the silver-particle dome.

Example 3

The following explains about a result of examination on a relation between the applied voltage value and the electron emission characteristic in the atmospheric forming process. Conditions on forming an element were the same as the electron emission element of Sample #1 in Example 1. However, for the sake of comparison, a final value of the applied voltage in the atmospheric forming process was changed to 17 V, 19 V, 25 V, 30 V, and 40 V.

In cases of voltage application ranges with the final values of 19 V and 25 V, cracks or splits were formed only in the silver-particle domes immediately after the atmospheric forming process. Meanwhile, in cases of voltage application ranges with the final values of 30 V and 40 V, immediately after the atmospheric forming process, the silver-particle domes were fully disappeared and only their traces were left on the surface of the silica particle layer. Furthermore, the silica particle layer and the surface electrode in the vicinity of the silver-particle domes were broken and scattered. However, in a case of a voltage application range with the final value of 17 V, no change was observed especially.

Figure 13:
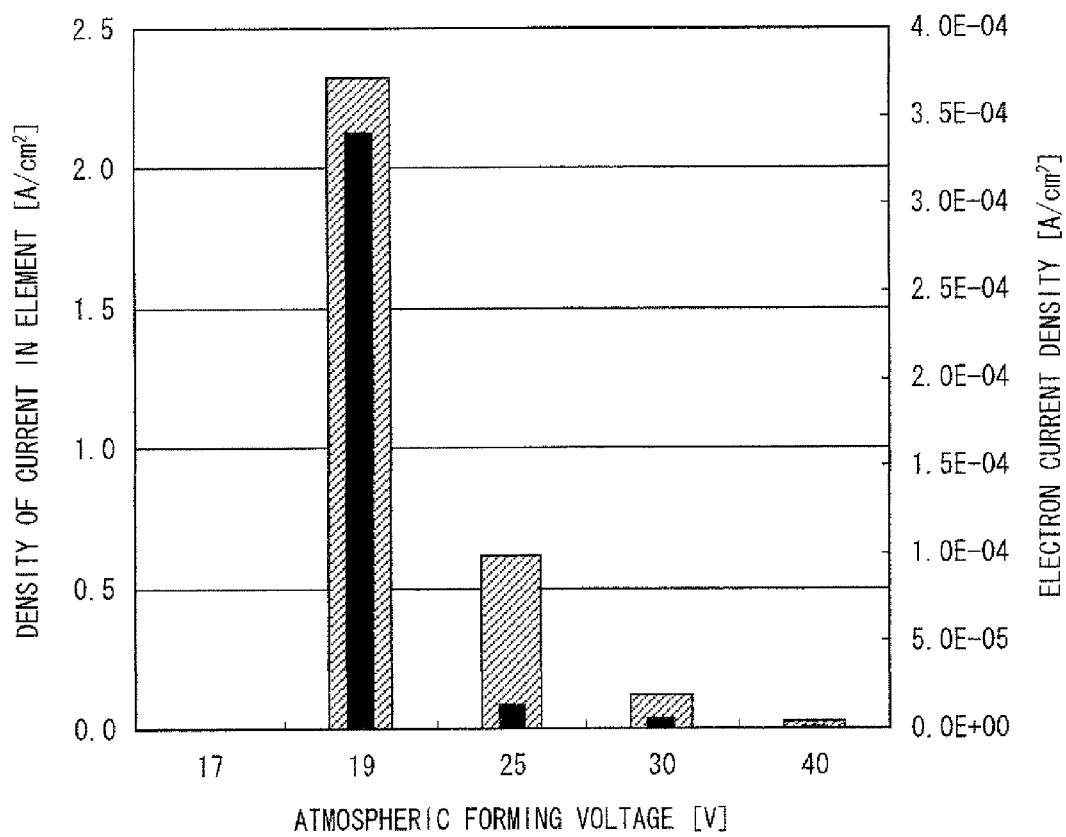
FIG. 13 illustrates a measurement result of current in an element and electron emission current, in vacuum, each of an electron emission element which is produced in the same manner as the electron emitting element of Sample #1 and which has been subjected to the forming process by changing a final voltage.

FIG. 13 shows the electron emission characteristic of the element obtained in Example 3. FIG. 13 shows current density in the element and electron emission current density, each per unit area (each measured at an applied voltage of +20 V), with respect to applied voltages in the atmospheric forming process in vacuum ($1\times10^{-8}$ ATM). Except for a result of 17 V, it is demonstrated that as the applied voltage increases in the atmospheric forming process, the current in the element decreases and an amount of the electron emission also decreases.

Figure 14:
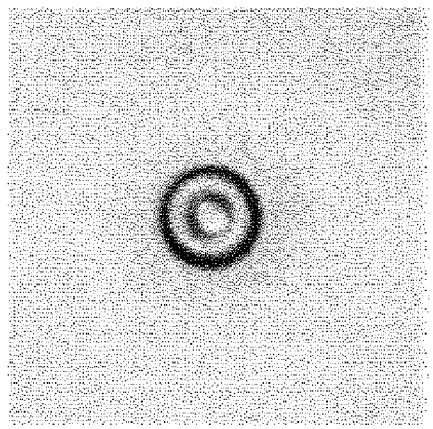
FIG. 14(a) illustrates a state of a surface of a silver particle dome and its surrounding, which silver particle dome is a deposition of conductive fine particles and has been subjected to the forming process under a different condition.
FIG. 14(b) illustrates a state of a surface of a silver particle dome and its surrounding, which silver particle dome is a deposition of conductive fine particles and has been subjected to the forming process under a different condition.
FIG. 14(c) illustrates a state of a surface of a silver particle dome and its surrounding, which silver particle dome is a deposition of conductive fine particles and has been subjected to the forming process under a different condition.
Figure 14:
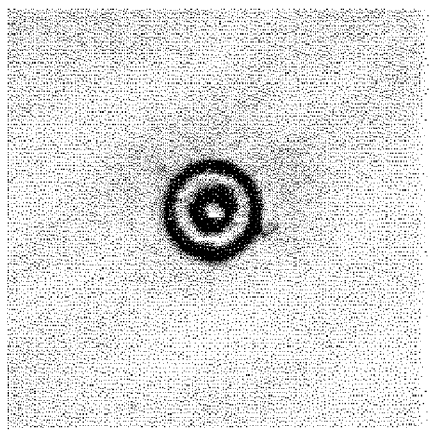
Figure 14:
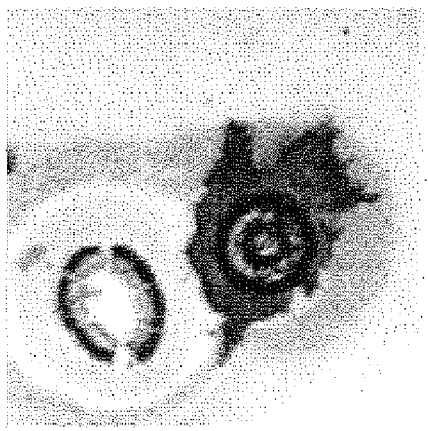

Further, FIG. 14($a$) through FIG. 14($c$) show states of a silver-particle dome, respectively at 17 V, 19 V, and 30 V, as final values. A conductive path to be formed in the element is mainly formed in a portion (silver-particle domes) where the silver nanoparticles are deposited. For this reason, from the result shown in FIG. 14($c$), if the silver-particle dome is significantly broken in the atmospheric forming process, this will make it difficult to form a current pathway. On the other hand, as shown in FIG. 14($a$), with an application of the voltage that does not cause any external change in the silver-particle dome, it is difficult to form a current pathway that allows flowing of sufficient current in the element. However, as shown in FIG. 14($b$), one having a recess adequately formed in a portion (silver-particle dome) where silver nanoparticles were deposited, a successful result was obtained.

From the results of Examples 1 and 3, a condition of the applied voltage in the atmospheric forming process is not less than 18.5 V but less than 30 V, more preferably not less than 18.5 V but less than 25 V. Further, it is preferable that a crack or a split is formed only in the silver-particle dome.

Example 4

An electron emitting element of Sample #3 was form in the same manner as the electron emitting element of Sample #1, except that a tetradecane dispersion solution in which silver nanoparticles were dispersed was thickly discharged by use of an inkjet so as to form a deposition of the silver nanoparticles in a plane manner on a silica particle layer. At this time, a discharge condition was such that discharge volume was 4 pL and discharge pitch was 62 μm. Under this condition, thus discharged dispersion solvent was formed in a plane manner such that adjacent tetradecane dispersion solvents are bonded to each other.

Figure 15:
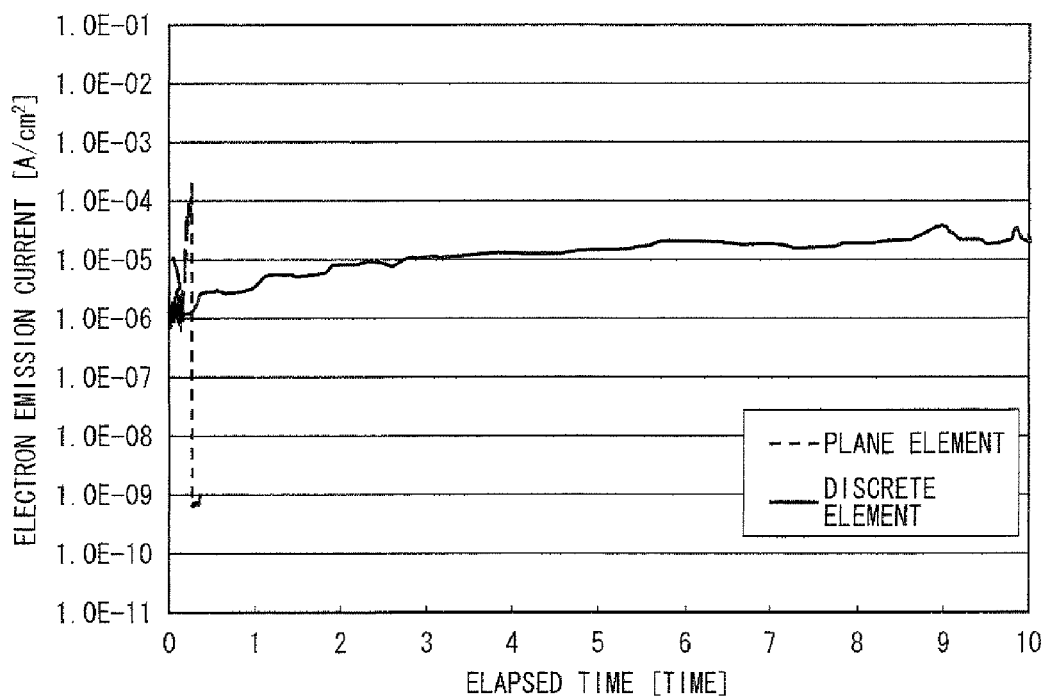
FIG. 15 illustrates a measurement result of electron emission current from each of electron emitting elements of Samples #7 and #8 that have been subjected to the forming process in the atmosphere.

The electron emitting element of Sample #3 (a plane element) thus formed was subjected to the forming process in the atmosphere under the same condition in Example 1. Then, a direct voltage (+18 V) was applied to the electron emitting element of Sample #3 in vacuum of $1\times10^{-8}$ ATM so that the element was consecutively driven. A result of the consecutive driving of the element is shown in FIG. 15. Further, FIG. 15 also shows a result of consecutive driving of the electron emitting element of Sample #1 in Example 1, which had been subjected to the atmospheric forming process.

As clearly shown in FIG. 15, the plane element exhibited abnormal increase in electron emission, and immediately after that, the electron emission stopped. This is because abnormal increase of electron emitting sections was caused in an aging process from limited electron emitting sections that were initially formed, and the element could not endure increase in the current in the element along with the increase in the electron emitting sections, thereby causing the element to be broken. From this result, it is found that the arrangement in which the spot-like depositions 107 are provided in a discrete manner is more preferable.

Example 5

Into a 10-mL reagent bottle, 2.0 g of an ethanol solvent and tetramethoxysilane KBM-04 (Shin-Etsu Chemical Co., Ltd.) were added. Further, as an insulating material, 0.5 g of spherical silica particles AEROSIL R8200 (manufactured by Evonik Degussa Japan Co., Ltd.) having an average diameter of 12 nm were added to the reagent bottle, and the reagent bottle was set in an ultrasonic dispersion device, so as to obtain a silica particle dispersion solution.

Then, the silica particle dispersion solution was dropped onto a 25 mm square glass substrate having an ITO thin film on its surface, serving as the electrode substrate 2, and the glass substrate was subjected to spin-coating at 8000 rpm and 10 s, and dried at a room temperature for a few hours. Thus, a silica particle layer was formed as the fine particle layer 105.

Subsequently, a tetradecane dispersion solution (manufactured by ULVAC, Inc., an average diameter of silver fine particles: 5.0 nm, solid density of the silver fine particles: 54%) in which silver nanoparticles were dispersed as the conductive fine particles 6 was discretely discharged onto a surface of the silica particle layer by use of a so-called inkjet head, so as to form silver-particle domes, which were depositions of the silver nanoparticles, serving as the depositions 107, in such a manner that a diameter of landing droplets was 26 μm and density was about 20,400 pieces per square centimeter. At this point, a discharge condition of the inkjet head was such that discharge volume was 4 pL, the solution was discharged in a staggered pattern, and a minimum distance between the landing droplets was 62 μm. In this case, a total surface area of the silver-particle domes with respect to a total area of the silica particle layer, that is, density of the landing droplets is 11%.

A basic solution was then applied to the silica particle layer having a number of silver-particle domes by the spin-coating method. The basic solution was prepared by poring 3 mL of a toluene solvent into a 10-mL reagent bottle, and adding thereto 0.03 g of AJISPER PB821 (manufactured by Ajinomoto Fine-Techno Co., Inc.), which is a basic dispersant (a copolymeric compound containing a basic functional group). Then, the reagent bottle was set in an ultrasonic dispersion device so that the basic dispersant was dispersed in the solvent. The basic solution thus obtained was dropped onto the silica particle layer of the glass substrate, and the glass substrate was then subjected to spin-coating at 1000 rpm and 10 s.

Finally, a surface electrode was formed, as the thin-film electrode 3, on the surface of the silica particle layer having the silver-particle domes by use of a magnetron sputtering device so that the surface electrode had a thickness of 160 nm, so as to obtain an electron emitting element of Sample No. 1 in which the silver-particle domes were closely formed and the surface electrode was thick. Gold was used as a material of the surface electrode, and the surface electrode had an area of 0.014 $cm^2$. In this case, the number of the silver-particle domes formed within the surface electrode was about 290.

Subsequently, a direct voltage was applied, in the atmosphere, to the electron emitting element thus obtained under the aforementioned production conditions, so as to form a conductive path (current pathway) in the silver-particle dome. At this time, a maximum value of the voltage was +20 V, the voltage was increased at a step of 0.1 V such that the voltage rose by 1 V per 3 seconds.

While the voltage is being applied in the above manner, a light emitting phenomenon, which is observable by eyes, occurs in the silver-particle dome on a surface of the element, thereby causing a crack or a split in a part of the silver-particle dome in return for the phenomenon. The crack of the split becomes an electron emitting section 108. Such a recess caused in the silver-particle dome becomes a conductive path when a voltage is applied again. In this regard, it is considered that this voltage application process in the atmosphere develops a conductive-path forming mechanism similar to the so-called "forming process" in which a conductive path is formed by applying an electric filed to a general MIM type electron emitting element.

Comparative Example 1

Further, an electron emitting element of Sample No. 2 was formed under the same conditions as the electron emitting element of Sample No. 1 except that a tetradecane dispersion solution in which silver nanoparticles were dispersed was discretely discharged onto a silica particle layer by use of an inkjet head in such a manner that 2 to 3.5% of a surface of the silica particle layer was covered with the silver nanoparticles. In the case of the electron emitting element of Sample No. 2, the number of the silver-particle domes provided within the surface electrode having an area of 0.014 cm$^2$ is around 55 to 100. This condition is a condition of an electron emitting element in which conductive-fine-particle domes are sparsely formed. As such, the electron emitting element of Sample No. 2 is an electron emitting element in which the silver-particle domes are sparsely formed and the surface electrode has a large thickness.

Comparative Example 2

Electron emitting elements of Samples No. 3A and 3B were formed under the same conditions as the electron emitting element of Sample No. 1 except that a surface electrode was formed, as a thin-film electrode 3, by use of a magnetron sputtering device on a surface of a silica particle layer having silver-particle domes formed thereon, so that the surface electrode had a thickness of 40 nm. In cases of the electron emitting elements of Samples No. 3A and 3B, the number of the silver-particle domes provided within the surface electrode having an area of 0.014 cm$^2$ is about 290. That is, the electron emitting elements of Samples No. 3A and 3B are electron emitting elements in which the silver-particle domes are formed closely to each other and the surface electrode has a small thickness.

Comparative Example 3

An electron emitting element of Sample No. 4 was formed under the same conditions as the electron emitting element of Sample No. 1 except that: (i) a tetradecane dispersion solution in which silver nanoparticles were dispersed was discretely discharged onto a silica particle layer by use of an inkjet head in such a manner that 2 to 3.5% of a surface of the silica particle layer was covered with the silver nanoparticles; and (ii) a surface electrode was formed, as the thin-film electrode 3, by use of a magnetron sputtering device on the surface of a silica particle layer having silver-particle domes formed thereon, so that the surface electrode had a thickness of 40 nm. The electron emitting element of Sample No. 4 is an electron emitting element in which the silver-particle domes are sparsely formed and the surface electrode has a small thickness.

Comparative Example 4

An electron emitting element of Sample No. 5 was formed under the same condition as the electron emitting element of Sample No. 1 except that a forming process was not carried out in the atmosphere. The electron emitting element of Sample No. 5 is an electron emitting element in which silver-particle domes are formed closely to each other, a surface electrode has a large thickness, and no current pathway and no electron emitting section 108 is formed.

These electron emitting elements of Samples No. 1 through 5 were subjected to an electron emission experiment. The electron emission experiment was carried out by use of the measurement system shown in FIG. 9.

Figure 16:
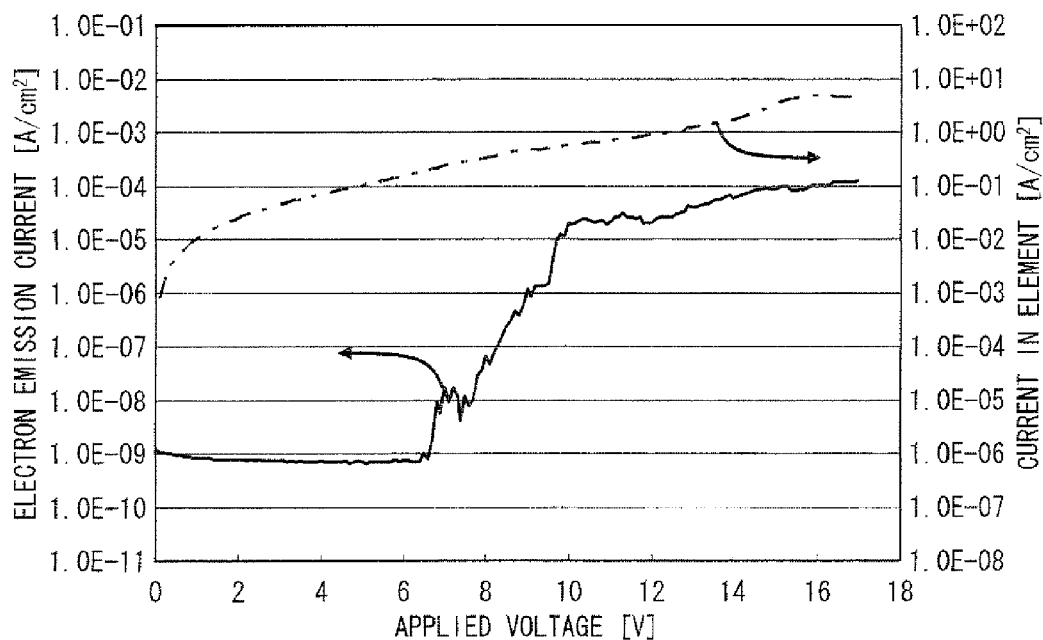
FIG. 16 illustrates a measurement result of current in an electron emitting element of Sample No. 1 in Example 5 while an applied voltage V1, applied in vacuum to the electron emitting element, increases in a stepwise manner.

FIG. 16 shows a result of measuring, in vacuum, an electron emission characteristic of the electron emitting element of Sample No. 1 in Example 5. When a voltage of 17 V was applied to the surface electrode, electron emission current per unit area was 1.24×10$^{-4}$ [A/cm$^2$].

Figure 17:
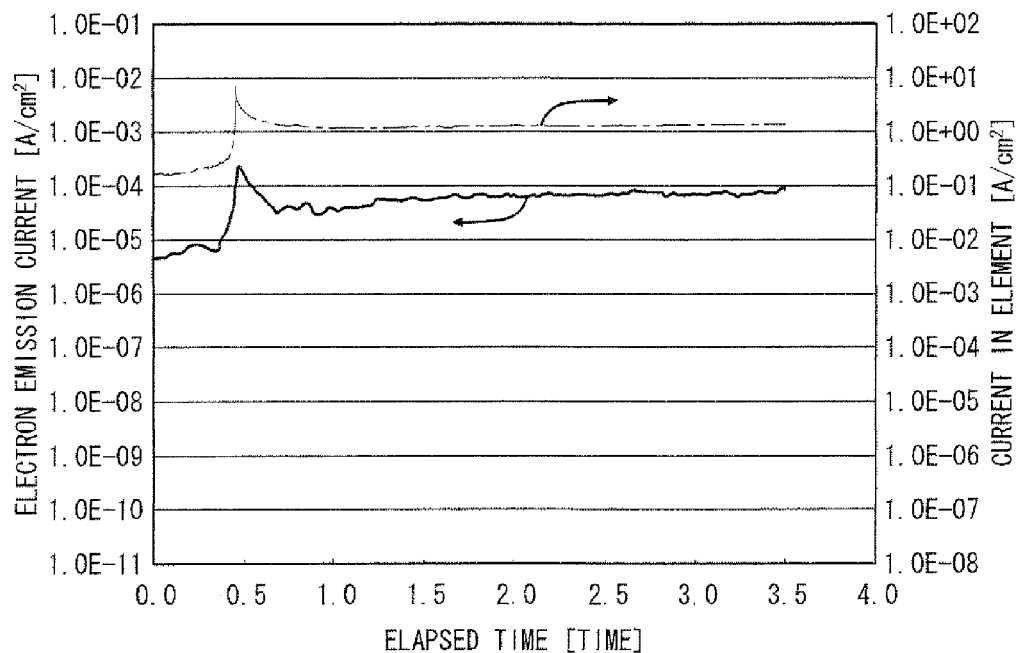
FIG. 17 illustrates a measurement result of respective changes of current in an element and electron emission current over time while an applied voltage V1 of +16 V is applied to the electron emission element of Sample No. 1 in Example 5.

Further, FIG. 17 shows a measurement result of change in each current over time while a voltage of +16 V was applied, in vacuum, to the electron emission element of Sample No. 1 in Example 5 so that the electron emitting element of Sample No. 1 was consecutively driven. During the consecutive driving at the voltage of +16 V, about 30 minutes after initiation of the voltage application, current significantly rose and continual light emitting occurred in the silver-particle domes on the surface of the silica-particle surface. At this time, any outstanding breaking mark was not formed in the silver-particle domes, but after reaching a peak, each current value maintained stable. Especially, an amount of electrons emitted maintained high.

Figure 18:
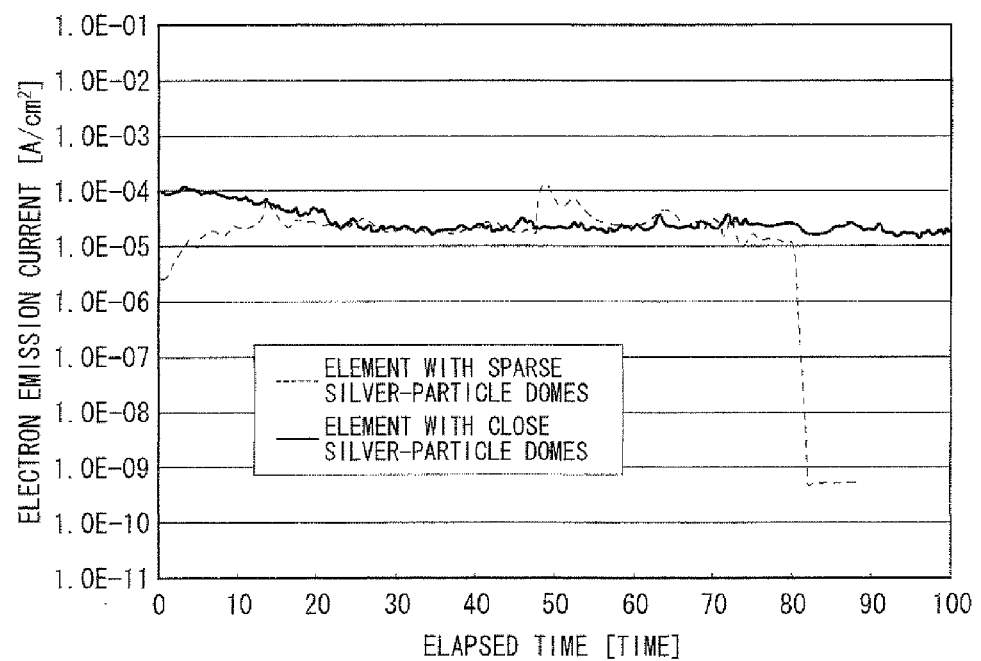
FIG. 18 illustrates a measurement result of respective changes of current in an element and electron emission current for 100 hours in a row while an applied voltage V1 of +16.5 V is applied to the electron emitting element of Sample No. 1 in Example 5, and also illustrates, as a comparative example, a result of those of an electron emitting element of Sample No. 4 (applied voltage: +18.0 V).

Further, FIG. 18 shows a measurement result of change in an amount of electrons emitted over time (temporal change of each current) while a voltage of +16.5 V was applied, in vacuum, to the electron emission element of Sample No. 1 in Example 5 so that the electron emitting element of Sample No. 1 was consecutively driven for 100 hours. Further, for comparison, FIG. 18 also shows a measurement result of temporal change in an amount of electrons emitted of the electron emitting element of Sample No. 4 in which the silver-particle domes were sparsely formed and the surface electrode had a thickness of 40 nm. A driving voltage of the electron emitting element of Sample No. 4 was +18 V.

Regardless of whether the silver-particle domes were formed sparsely or closely to each other, theses electron emitting elements exhibited almost the same amount of electrons emitted, after 20 hours passed since initiation of consecutive driving. However, in the electron emitting element of Sample No. 4 in Example 4 having sparsely-formed silver-particle domes, the amount of electrons emitted became pulsed after 80 hours passed, and the electron emission stopped after about 84 hours passed. On the other hand, the electron emitting element of Sample No. 1 having closely-formed silver-particle domes could stably emit electrons for 100 hours.

Moreover, in a case of the electron emitting element of Sample No. 2 in Comparative Example 1 in which the surface electrode was thick and the silver-particle domes were sparsely formed, when the element was consecutively driven for long hours, portions where the silver-particle domes were not provided (i.e., the silica particle layer and the surface electrode deposited on a surface of the silica particle layer)

were broken during the driving. The breaking tended to increase as time passed, and finally, the surface electrode lost its conductivity, thereby causing the element to stop emitting electrons. It is considered that the breaking was caused such that a very small amount of current having an intense electric field flowed into the silica particle layer where no current flowed in a normal situation, and the current accumulated, thereby causing insulation breakdown in the silica particle layer.

In contrast, in the electron emitting element of Sample No. 1 in which the surface electrode was thick and the silver-particle domes were formed closely to each other, no breaking like above occurred. One presumable reason is as follows. That is, accumulation of electric charge in the silica particle layer where no current flows in a normal situation, also occurs similarly to the element having sparsely-formed silver-particle domes. However, the silver-particle domes where current easily flows are provided in a close manner, so that part of the electric charge sequentially leaks into the silver-particle domes before the electric charge accumulates enough to break the silica particle layer. As a result, it is presumed that insulation breakdown large enough to break the silica particle layer hardly occurs.

Further, the electron emitting element of Sample No. 3A in Comparative Example 2 in which the silver-particle domes were formed closely to each other and the surface electrode was thin was consecutively driven at an applied voltage of +18 V, for example. In this case, a few minutes after initiation of driving, current in the element and electron emission current rapidly increased to values that were far beyond supply capacity of the power supply, with result that no voltage was applied to the element.

During rapid increase in these current, light emission repeatedly occurred in a pulse manner in the silver-particle domes on the surface of the element, thereby resulting in that it was observed that a part of the domes was broken.

Figure 19:
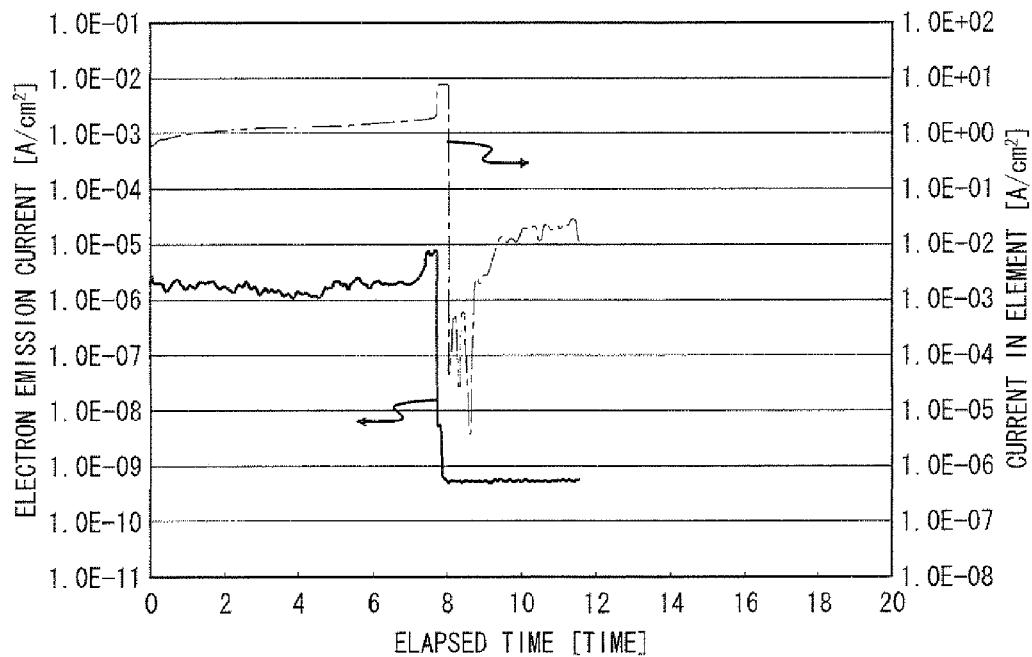
FIG. 19 illustrates a measurement result of respective changes of current in an element and electron emission current over time while an applied voltage V1 of +13V is applied to an electron emitting element of Sample No. 3B in Comparative Example 2.

FIG. 19 shows a measurement result of the electron emitting element of Sample No. 3B in Comparative Example 2 when the electron emitting element of Sample No. 33 was consecutively driven at a lower applied voltage of +13 V. FIG. 19 shows temporal change in each current in the electron emitting element in which the silver-particle domes were formed closely to each other and the surface electrode had a thin thickness of 40 nm, while a voltage of +13 V was applied to the electron emitting element. In the aforementioned case, a few minutes after initiation of driving, current flowing in the element and electron emission current rapidly increased to values that were far beyond supply capacity of the power supply, thereby resulting in that no voltage was applied to the element. On the other hand, under this condition, significant increase in the current occurred about 8 hours after initiation of voltage application, and immediately after the phenomenon occurred, the electron emission stopped.

From these results, the following facts were found. That is, only by increasing the density of the silver-particle domes, it is still difficult to realize stable operation of the element over time. In a case where the surface electrode serving as the thin-film electrode 3 is thin, even if a driving voltage is low, consecutive driving of the element causes the current in the element and the electron emission current to rapidly increase to values far beyond supply capacity of the power supply a few minutes after the initiation of driving, thereby resulting in that no voltage is applied to the element.

This physical phenomenon cannot be explained clearly. However, like the electron emitting element of Sample No. 1 in Example 5, the arrangement in which the thickness of the surface electrode was increased and the driving voltage was set lower than +18 V could prevent the physical phenomenon.

As such, with the configuration in which the density of silver nanoparticles is high, the thickness of the thin-film electrode is increased, and further, the driving voltage is low, it is possible to provide an element which maintains a high amount of electron emission current and which can stably emit electrons for a long period.

Figure 20:
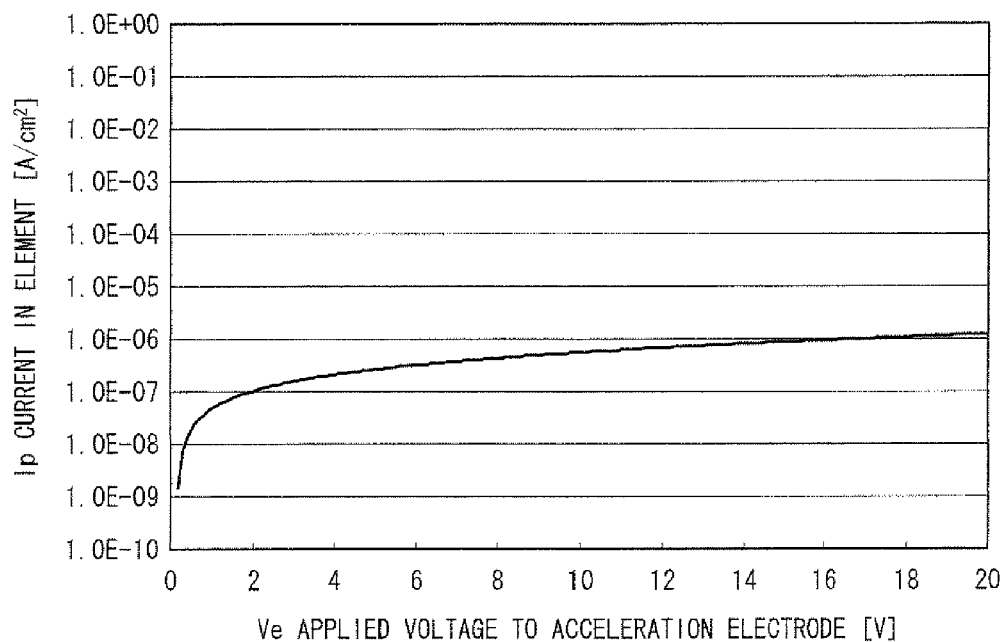
FIG. 20 illustrates a measurement result of current in an element emitting element of Sample No. 5 in Comparative Example 4 in vacuum.

Further, FIG. 20 shows a measurement result of the electron emission element of Sample No. 5 in Comparative Example 4, which was not subjected to the forming process in the atmosphere. In the element that was not subjected to the forming process, a value of current in the element was $1.2 \times 10^{-6}$ A/cm$^2$ at an applied voltage of +20 V. In comparison with the electron emission element of Sample No. 4 in Comparative Example 3 in which the silver-particle domes were sparsely formed and the surface electrode had a thin thickness, the current in the element was increased, but no electron emission from the element was caused.

Figure 21:
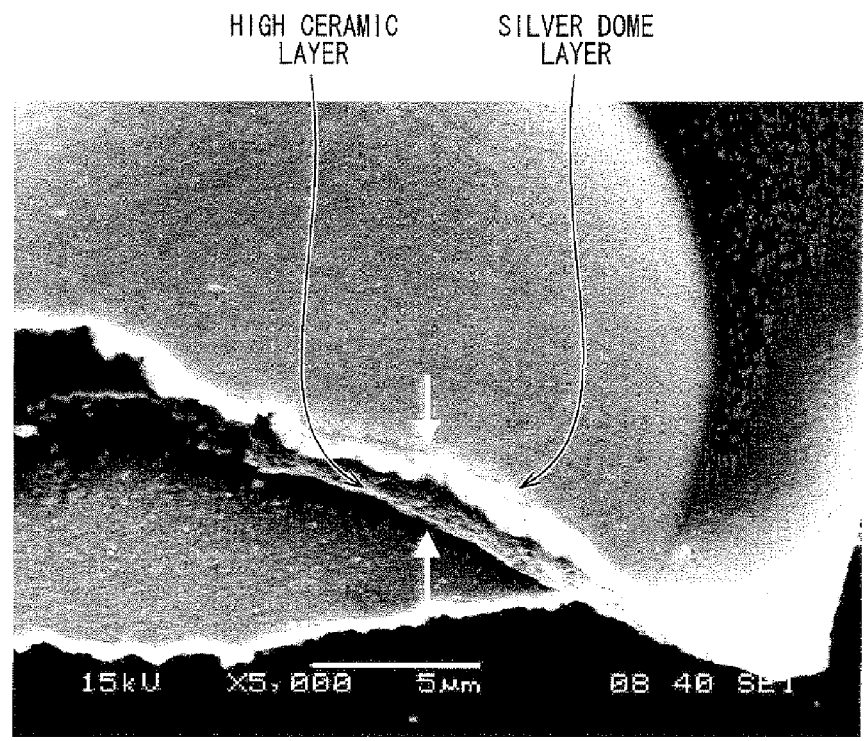
FIG. 21 is a micrograph of the electron emitting element 1 (Sample No. 1) of Example 5.

Moreover, FIG. 21 is a microgram of the electron emission element of Sample No. 1 in Example 5. From FIG. 21, it is considered that the silver-particle dome (a silver-dome layer) has a thickness equal to or slightly larger than a thickness of the silica particle layer. Even if an application condition is changed, the silica particle layer is formed to have a thickness of around 1 μm (the thickness becomes slightly thicker than 1 μm at a low spin rate, and the thickness becomes slightly thinner than 1 μm at a high spin rate). For this reason, it is presumed that a height of the silver dome is also around 1 μm.

Embodiment 3

FIGS. 22 through 25 respectively show light emitting devices 31, 31', and 31" according to the present invention, each including an electron emitting device 10 having an electron emitting element 1, 100 according to one embodiment of the present invention explained in [Embodiments 1, 2].

Figure 22:
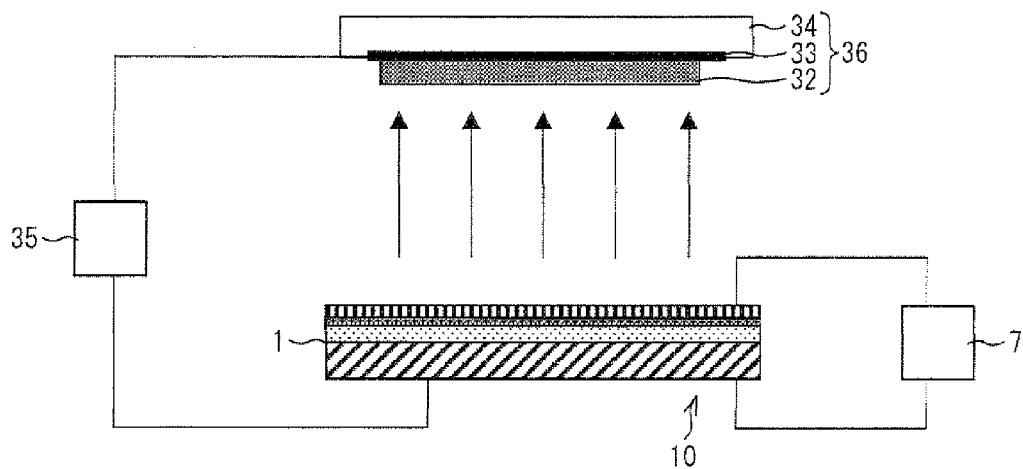
FIG. 22 is a diagram illustrating one example of a light emitting device including the electron emitting device of FIG. 1 or FIG. 3.

A light emitting device 31 shown in FIG. 22 includes: an electron emitting device 10 including an electron emitting element 1, 100 and a power supply 7; and a light emitting section 36. The light emitting section 36 is structured such that an ITO film 33 and a luminous body 32 are laminated on a glass substrate 34 as a base material. The light emitting section 36 is provided in a position that is apart from the electron emitting element 1, 100 so that the luminous body 32 faces the electron emitting element 1, 100. The light emitting device 31 is sealed in vacuum.

Suitable materials of the luminous body 32 are materials that are excited by electrons and that correspond to red light emission, green light emission, and blue light emission, respectively. Examples usable as such materials corresponding to red are $Y_2O_3$:Eu, and (Y, Gd)$Bo_3$:Eu; examples usable as such materials corresponding to green are $Zn_2SiO_4$:Mn and $BaAl_{12}O_{19}$:Mn; and an example usable as such materials corresponding to blue is $BaMgAl_{10}O_{17}$:Eu$^{2+}$. A film of the luminous body 32 is formed on the ITO film 33 which is formed on the glass substrate 34. It is preferable that the luminous body 32 is approximately 1 μm in thickness. Further, the ITO film 33 may have any thickness as long as the ITO film 33 can reliably have electric conductivity at the thickness. In the present embodiment, the ITO film 33 is set to 150 nm in thickness.

For forming a film of the luminous body 32, a mixture of epoxy resin serving as a binder and luminous-body particles is prepared, and a film of the mixture may be formed by a known method such as a bar coater method or a dropping method.

In this embodiment, in order to increase a brightness of light emitted from the luminous body 32, it is necessary to accelerate, toward the luminous body 32, electrons which are emitted from the electron emitting element 1. In order to realize such acceleration, such a configuration is preferable that, as shown in FIG. 22, a power supply 35 should be provided between the electrode substrate 2 of the electron emitting element 1, 100 and the ITO film 33 of the light-emitting section 36, in order to form an electric field for accelerating the electrons. In this case, it is preferable that: (i) a distance between the luminous body 32 and the electron emitting element 1, 100 is 0.3 mm to 1 mm; a voltage applied by the power supply 7 is 18V; and a voltage applied by the power supply 35 is 500 V to 2000 V.

Figure 23:
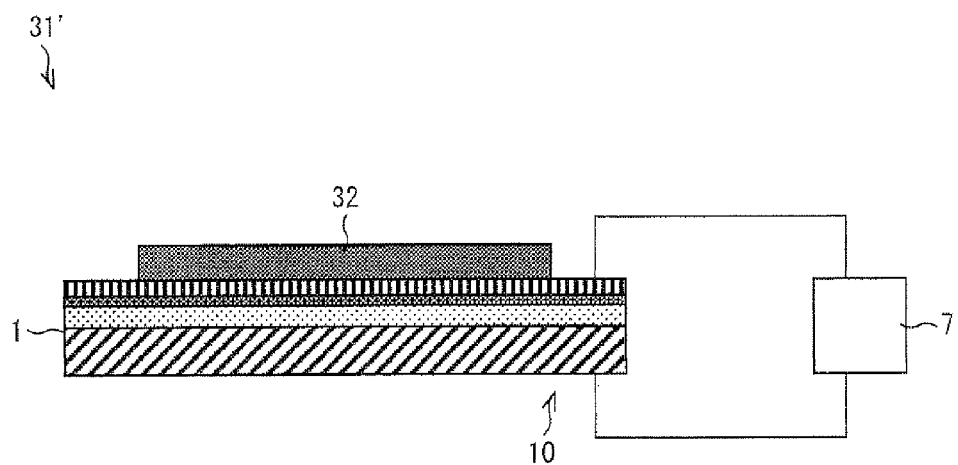
FIG. 23 is a diagram illustrating another example of the light emitting device including the electron emitting device of FIG. 1 or FIG. 3.

A light emitting device 31' shown in FIG. 23 includes the electron emitting device 10 including an electron emitting element 1, 100 and a power supply 7 for applying a voltage to the electron emitting element 1, 100, and a luminous body (light emitting body) 32. In the light emitting device 31', the luminous body 32 is a planar luminous body which is provided on a surface of the electron emitting element 1, 100. In the present embodiment, a layer of the luminous body 32 is formed on a surface of the electron emitting element 1, 100, in such a manner that a mixture of epoxy resin serving as a binder and luminous-body particles is prepared as described above and a film of the mixture is formed on the surface of the electron emitting element 1, 100. Note that, because the electron emitting element 1, 100 itself has a structure which is vulnerable to external force, the element may be damaged as a result of use of the bar coater method. Therefore, it is preferable to use the dropping method or the spin coating method.

Figure 24:
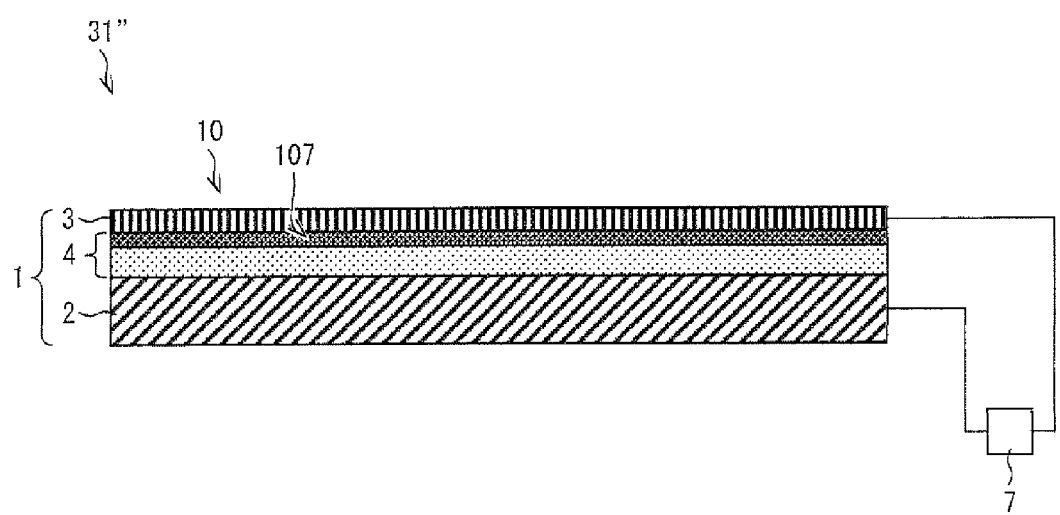
FIG. 24 is a diagram illustrating further another example of the light emitting device including the electron emitting device of FIG. 1 or FIG. 3.

A light emitting device 31" shown in FIG. 24 includes the electron emitting device 10 including an electron emitting element 1, 100, and a power supply 7 for applying a voltage to the electron emitting element 1, 100. Further, in an electron acceleration layer 4 of the electron emitting element 1, 100, luminous fine particles as a luminous body (light emitting body) 32' are mixed in. In this case, the luminous body 32' may be configured to also serve as the insulating fine particles 5. Generally, however, the luminous-body fine particles have low electric resistance. As compared to electric resistance of the insulating fine particles 5, the electric resistance of the luminous-body fine particles is clearly lower. Therefore, when the luminous-body fine particles are mixed in replacement of the insulating fine particles 5, an amount of the luminous-body fine particles should be suppressed to a small amount. For example, when spherical silica particles (average diameter of 110 nm) are used as the insulating fine particles 5 and ZnS:Mg (average diameter of 500 nm) is used as the luminous-body fine particles, an appropriate mixture ratio by weight of the insulating fine particles 5 and the luminous-body fine particles is approximately 3:1.

In the above light emitting devices 31, 31', and 31", electrons emitted from the electron emitting element 1, 100 are caused to collide with the corresponding luminous bodies 32, 32' so that light is emitted. The light emitting devices 31, 31', and 31" can efficiently emit light because the electron emission element 1, 100 is improved in an amount of electrons emitted.

Figure 25:
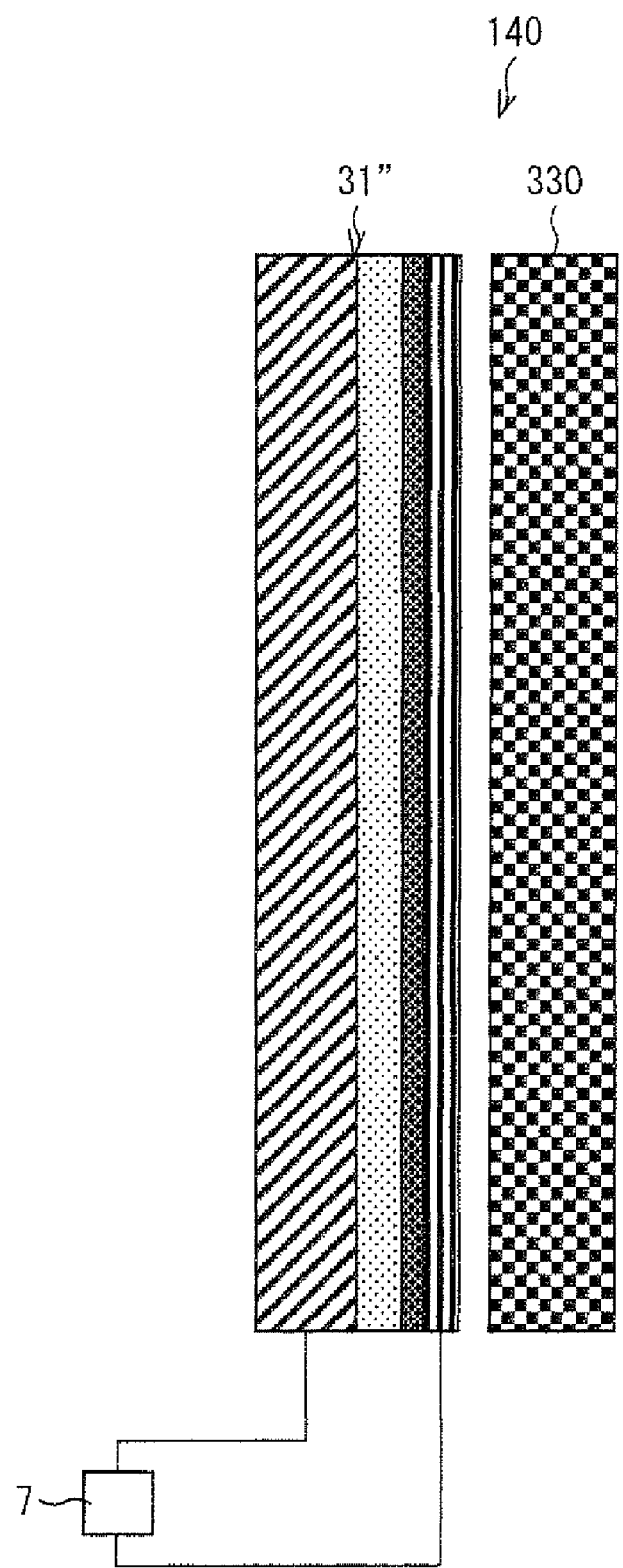
FIG. 25 is a diagram illustrating one example of an image display device including the light emitting device including the electron emitting device of FIG. 1 or FIG. 3.

FIG. 25 illustrates an example of an image display device of the present invention which includes a light emitting device of the present invention. An image display device 140 illustrated in FIG. 25 includes a light emitting device 31" illustrated in FIG. 24, and a liquid crystal panel 330. In the image display device 140, the light emitting device 31" is provided behind the crystal panel 330 and used as a backlight. In cases where the light emitting device 31" is used in the image display device 140, it is preferable that a voltage of 20 V to 35 V be applied to the light emitting device 31". The light emitting device 31" should be configured to emit, for example, 10 $\mu A/cm^2$ of electrons per unit of time at the voltage of 20 V to 35 V. Further, it is preferable that a distance between the light emitting device 31" and the liquid crystal panel 330 is approximately 0.1 mm.

In cases where light emitting devices 31 illustrated in FIG. 22 are used as an image display device of the present invention, the light emitting devices 31 may be arranged in a matrix so as to form a shape that allows the light emitting devices 31 themselves serving as an FED to form and display an image. In such cases, it is preferable that a voltage applied to the light emitting device 31 is in a range of 20 V to 35 V. The light emitting device 31 should be configured to emit, for example, 10 $\mu A/cm^2$ of electrons per unit of time, at the applied voltage in the range of 20 V to 35 V.

As described above, a first object of the present invention is to provide: (i) an electron emitting element which prevents that an electron-emitting side electrode gradually wears off along with electron emission and which can maintain its electron emission characteristic for a long period; and (ii) a method for producing the electron emitting element.

Further, a second object of the present invention is to provide an electron emitting element which can control (a) from which positions electrons are emitted in a thin-film electrode of the electron emitting element, (b) an amount of the electrons emitted per unit area, and the like, as well as preventing that an electron-emitting side electrode gradually wears off along with electron emission and maintaining its electron emission characteristic for a long period.

In order to achieve the first object, an electron emitting element of the present invention includes: an electrode substrate and a thin-film electrode, which are provided so as to face each other; and an electron acceleration layer sandwiched between the electrode substrate and the thin-film electrode, the electron emitting element (i) accelerating electrons in the electron acceleration layer at a time when a voltage is applied between the electrode substrate and the thin-film electrode and (ii) emitting the electrons from the thin-film electrode, the electron acceleration layer including a fine particle layer containing insulating fine particles to which fine particle layer a single material or a mixed material that facilitates electricity flow in a thickness direction of the fine particle layer is applied, and the electron acceleration layer including a conductive path formed therein in advance such that the conductive path runs through the electron acceleration layer in a thickness direction of the electron acceleration layer, the conductive path having an exit serving as an electron emitting section via which the electrons are supplied to the thin-film electrode. Here, that a conductive path is formed in advance means that the conductive path is formed before the element is driven by applying a voltage to the element in vacuum, that is, the conductive path is formed in course of producing the electron emitting element.

In the configuration, while a voltage is applied between the electrode substrate and the thin-film electrode, current flows in the electron acceleration layer. A part of electrons in the current becomes ballistic electrons due to an intense electric field formed by the applied voltage, and the ballistic electros are emitted from a side of the thin-film electrode.

The electros are emitted not from unprescribed portions on the side of the thin-film electrode, but from an electron emitting section that is formed in advance in the electron acceleration layer provided below the thin-film electrode. The electron emitting section is an exit of a conductive path that is formed in the electron acceleration layer so as to run through the electron acceleration layer in its thickness direction. The electrons to be emitted from the thin-film electrode are supplied to the thin-film electrode via the conductive path and then emitted from the thin-film electrode to outside.

Such a conductive path (the conductive path formed in advance) can be easily formed by the atmospheric forming process due to action of the single material or mixed material that facilitates electricity flow in a thickness direction of the fine particle layer, which material is applied to the fine particle layer containing insulating fine particles.

The atmospheric forming process is a process of forming a conductive path for current in the element that flows from a side of the electrode substrate to a side of the thin-film electrode via the fine particle layer, by applying a direct voltage between the electrode substrate and the thin-film electrode in the atmosphere.

As such, the conductive path is formed in advance in the electron acceleration layer by the forming process in the atmosphere. As a result, when a voltage is subsequently applied, in vacuum, to the element to emit electrons, the current in the element flows in the conductive path thus formed in advance, without newly forming a conductive path. Consequently, the conductive path can work stably when the electrons are emitted. In contrast, in a case where a voltage is applied, in vacuum, to an element in which no conductive path is formed in advance, the voltage application causes formation of a conductive path as well as electrons emission. That is, the conductive path is being formed while the electrons are being emitted. The conductive path thus formed under such a condition is not constant, and a new conductive path is formed every time when a voltage is applied to the element in vacuum. As a result, every time when the voltage is applied in vacuum, a conductive state of the element changes, thereby resulting in that a stable electron emission characteristic cannot be obtained.

As such, in the electron emitting element of the present invention, the electrons are emitted not from unprescribed portions in the electron acceleration layer but from a specific portion, i.e., the electron emitting section in the electron acceleration layer. On this account, a portion, in the thin-film electrode, which is inversely sputtered with the emitted electrons is limited to a portion positioned right above the electron emitting section and a portion positioned in the vicinity of the electron emitting section. Accordingly, the other portions in the thin-film electrode except for the portion right above the electron emitting section and the portion in the vicinity of the electron emitting section are not exposed to the electrons, thereby preventing that a constituent metal material of the thin-film electrode wears off over time by being sputtered with the emitted electrons and the thin-film electrode finally loses its function as an electrode.

In the electron emitting element of the present invention, it is preferable that the single material or the mixed material be applied to the fine particle layer in a discrete manner when the fine particle layer is viewed from its top face.

The configuration may be also possible such that the single material or mixed material that facilitates the electricity flow is applied to a whole surface of the fine particle layer. However, in the case where the conductive path is formed by carrying out the forming process, the configuration in which the single material or the mixed material is applied to the whole surface, the conductive path is formed in a portion where current easily flow, thereby resulting in that the electron emitting section is formed randomly. In such a case, it is difficult to control, by forming the electron emitting section at a given portion in a plane of the thin-film electrode, from which positions electrons are emitted in the thin-film electrode and an amount of the electrons emitted per unit area. The amount of the electrons emitted can be also controlled by changing a voltage applied between the electrode substrate and the thin-film electrode such that a low voltage causes a small amount of electrons emitted and a high voltage causes a large amount of electrons emitted. However, in the element of the present invention, the amount of electrons emitted is extremely small at a low voltage and an electron emission efficiency markedly decreases. On this account, such a control of the amount of electrons emitted due to an applied voltage cannot be used in cases of extremely reducing the amount of electrons emitted.

In contrast, in the above configuration, the single material or the mixed material is applied to the fine particle layer in a discrete manner when viewed from a top face of the fine particle layer. As a result, in a case where the conductive path is formed by the forming process in the atmosphere, the conductive path where current in the element flows is formed in each portion to which the single material or the mixed material is applied, and therefore the electron emitting section is formed in the each portion. As such, with the configuration in which the portions to which the single material or the mixed material is applied are positioned in a discrete manner, it is possible to provide the electrons emitting sections at any given positions in the plane of the thin-film electrode, and to control from which positions electrons are emitted in the thin-film electrode and the amount of the electrons emitted per unit area.

Furthermore, the applicants of the present invention further examined this configuration in which the single material or the mixed material is discretely applied to the fine particle layer, and found that, in order to drive an electron emitting element over time, the number of electron emitting sections with respect to a surface area of the thin-film electrode and the thickness of the thin-film electrode are important.

That is, it is found that, in a case where the number of electron emitting sections with respect to the surface area of the thin-film electrode is small, a portion, in the electron acceleration layer, where no electron emitting section is provided, i.e., (i) a portion, in the fine particle layer, to which the single material or the mixed material is not applied and (ii) a portion in the thin-film electrode, which is positioned right above that portion in the fine particle layer, are easily broken in a selective manner, during consecutive driving (long-period driving), thereby resulting in that surface conduction is reduced during the consecutive driving and finally the electron emission stops.

Such a phenomenon is caused presumably due to occurrence of insulation breakdown in the fine particle layer that is caused such that a portion of the fine particle layer except for the electron emitting sections is broken, so that a very small amount of current flows into a fine-particle portion (a portion where no electron emitting section is formed) where current does not flow in a normal situation, and an electric charge is accumulated by carrying out the consecutive driving many times.

Further, it is also found out that, in a case where the thickness of the thin-film electrode is not sufficient, even if the number of electron emitting sections with respect to the surface area of the thin-film electrode is sufficient and an applied voltage is low, the portion to which the single material or the mixed material is applied is broken during the consecutive driving, thereby causing the electron emission to stop.

In view of this, in order to achieve the second object, it is preferable that a total surface area of portions, in the fine particle layer, to which the single material or the mixed material is applied be not less than 5% but not more than 90.6% with respect to a surface area of the fine particle layer, and the thin-film electrode have a thickness of not less than 100 nm but not more than 500 nm.

When the total surface area of the portions to which the single material or the mixed material is applied is in the above range with respect to the surface area of the fine particle layer, it is possible to prevent that a portion in the electron acceleration layer, other than the portions where the electron emitting sections are formed, is selectively broken during the consecutive driving. Further, with the thickness of the thin-film electrode in the above range, it is possible to prevent that (i) the portions, in the fine particle layer, to which the single material or the mixed material is applied, or (ii) both of that portions and portions in the thin-film electrode right above that portions in the fine particle layer are broken during the consecutive driving, without interfering the electron emission via the thin-film electrode.

Further, it is more preferable that the lower limit of the total surface area of the portion, in the fine particle layer, where the single material or the mixed material is applied be not less than 10% with respect to the surface area of the fine particle layer. This makes it possible to more surely prevent that the portion in the electron acceleration layer, except for the portions where the electron emitting sections are formed, is selectively broken during the consecutive driving.

Moreover, it is more preferable that the lower limit of the thickness of the thin-film electrode is not less than 160 nm. This makes it possible to more surely prevent that the portions, in the fine particle layer, to which the single material or the mixed material is applied, or both of that portions and portions in the thin-film electrode right above that portions in the fine particle layer are broken during the consecutive driving.

With the further preferable configurations, the electron emitting element of the present invention can (i) control from which positions electrons are emitted in the thin-film electrode, an amount of the electrons emitted per unit area, and the like, (ii) prevent that a constituent material of an electron-emitting side electrode gradually wears off along with electron emission, thereby allowing maintaining an electron emission characteristic for a long period, and further, (iii) restrain accumulation of electric charge in a portion other than the electron emitting sections so that electrons can be stably emitted during the consecutive driving while maintaining a large amount of electron emission current.

Moreover, the electron emitting element of the present invention can be also configured such that the single material or the mixed material is conductive fine particles, the conductive fine particles are deposited on a surface of the fine particle layer so as to form a deposition, and the deposition of the conductive fine particles has a physical recess serving as the electron emitting section.

The single material or the mixed material can be, for example, conductive fine particles. The conductive fine particles can be provided to the fine particle layer in such a manner that the conductive fine particles are deposited on the surface of the fine particle layer to form a deposition. In the deposition of the conductive fine particles, a physical recess serving as an electron emitting section is formed during forming the conductive path.

In the electron emitting element of the present invention, it is preferable that the fine particle layer further include binder resin that binds the insulating fine particles to one another.

With the configuration, since the insulating fine particles in the fine particle layer are bound to each other due to the binder resin, it is possible to increase a mechanical intensity of the electron emitting element. Further, in a case where the single material or the mixed material is conductive fine particles, the conductive fine particles are easily deposited on the surface of the fine particle layer rather than get into the fine particle layer because the fine particle layer is solidified by the binder resin. As a result, it is possible to easily realize the configuration of the electron emitting element of the present invention.

In the electron emitting element of the present invention, the conductive fine particles may be noble metal. As such, when the conductive fine particles are noble metal, it is possible to prevent deterioration of the element, such as oxidation of the conductive fine particles due to oxygen in the atmosphere. As a result, it is possible to make the electron emitting element to be used for a long time.

Further, the electron emitting element of the present invention may be configured such that the conductive fine particles contain at least any one of gold, silver, platinum, palladium, and nickel. When the conductive fine particles contain at least any one of gold, silver, platinum, palladium, and nickel, as such, it is possible to more effectively prevent deterioration of the element, such as oxidation of the conductive fine particles due to oxygen in the atmosphere. As a result, it is possible to make the electron emitting element to be used for a long period.

Furthermore, the electron emitting element of the present invention may be configured such that the thin-film electrode contains at least one of gold, silver, carbon, tungsten, titanium, aluminum, and palladium. In view of the forming process under the atmospheric pressure, gold is particularly preferable among these materials because the gold causes less oxide and sulfur compound formation reaction. Further, silver, palladium, tungsten, and the like have relatively small oxide formation reaction, and therefore, can be practically used without any trouble.

An electron emitting element of the present invention includes any one of the above electron emitting elements, and a power supply section for applying a voltage between an electrode substrate and a thin-film electrode provided in the electron emitting element.

As has been already described in terms of the electron emitting element, the electron emitting element of the present invention can prevent that the thin-film electrode gradually wears off along with electron emission and can maintain its electron emission characteristic for a long period. On this account, the electron emitting device including the electron emitting element is an electron emitting device that can maintain its electron emitting characteristic for a long period.

Further, as has been already described in terms of the electron emitting element, by employing a more preferable configuration, the electron emitting element of the present invention can (i) control from which positions electrons are emitted in the thin-film electrode, an amount of the electrons emitted per unit area, and the like, (ii) prevent that an electron-emitting side electrode gradually wears off along with electron emission, thereby allowing maintaining an electron emission characteristic for a long period, and further, (iii) restrain accumulation of electric charge in a portion other than the electron emitting sections so that electrons can be stably emitted during the consecutive driving while a large amount of electron emission current is maintained. Therefore, the electron emitting device including such an electron emitting element can also (i) control from which positions the electrons are emitted, an amount of the electrons emitted per unit area, and the like, (ii) prevent that a constituent material of the electron-emitting side electrode gradually wears off along with electron emission, thereby allowing maintaining an electron emission characteristic for a long period, and further, (iii) restrain accumulation of electric charge in a portion other than the electron emitting sections so that the electrons can be stably emitted during the consecutive driving while a large amount of electron emission current is maintained.

Furthermore, a light emitting device employing the electron emitting device of the present invention is also included in the scope of the present invention.

A method of the present invention for producing an electron emitting element is a method for producing an electron emitting element including (i) an electrode substrate and a thin-film electrode, which are provided so as to face each other, and (ii) an electron acceleration layer provided between the electrode substrate and the thin-film electrode, the thin-film electrode emitting electrons that are accelerated in the electron acceleration layer while a voltage is being applied between the electrode substrate and the thin-film electrode, and the method of the present invention includes the steps of: (a) forming the electron acceleration layer in such a manner that a fine particle layer containing insulating fine particles is formed on the electrode substrate, and conductive fine particles are deposited on a surface of the fine particle layer so as to form a deposition of the conductive fine particles; (b) forming the thin-film electrode on a surface of the electron acceleration layer; and (c) carrying out a forming process of forming a conductive path in the electron acceleration layer by applying a direct voltage between the electrode substrate and the thin-film electrode.

With the above method, it is possible to obtain the electron emitting element of the present invention that can maintain its electron emission characteristic for a long period.

In the method of the present invention for producing an electron emitting element, it is preferable that the step (a) discretely deposit the conductive fine particles on the surface of the fine particle layer so as to form depositions in a discrete manner.

With the method, it is possible to obtain the aforementioned electron emitting element of the present invention which can maintain its electron emission characteristic for a long period and which can control from which positions the electrons are emitted in the thin-film electrode, an amount of the electrons emitted per unit area, and the like.

In the method of the present invention for producing an electron emitting element, it is preferable that in the step (a), a basic solution into which an electron donor that donates a pair of electrons is introduced as a substituent be applied all over the surface of the electron acceleration layer.

With the method, it is possible to form the electron emitting section by the forming process in the atmosphere with high reproduction and small energy under moderate process conditions.

The basic solution includes, as a substituent, an electron donor that donates a pair of electrons. An electron donating substituent having the electron donor is ionized after donating electrons (a pair of electrons). It is considered that the ionized electron donating substituent transfers electric charge on surfaces of the insulating fine particles, thereby allowing electric conduction on the surfaces of the insulating fine particles. Further, it is also considered that due to an atmospheric condition that the forming process is carried out in the atmosphere, surface adhesion of water molecules or oxygen molecules in the atmosphere facilitates the electric conduction phenomenon.

In the method of the present invention for producing an electron emitting element, it is preferable that in the step (c), the direct voltage is applied such that the direct voltage is increased in a stepwise manner.

In forming the electron emitting section in the forming process, when the voltage that causes a necessary electric field is applied at once between the electrode substrate and the thin-film electrode, the electrons may cause insulation breakdown.

In the above method, the voltage is increased in a stepwise manner, thereby making it possible to carry out the forming process without causing the insulation breakdown.

In the method of the present invention for producing an electron emitting element, it is preferable that in the step (c), the direct voltage be applied so that an electric field intensity generating between the electrode substrate and the thin-film electrode is $1.9 \times 10^7$ to $4.1 \times 10^7$ [V/m].

In a case where the electric field intensity is less than $1.9 \times 10^7$ [V/m], the forming process cannot be carried out, or even if the forming process can be carried out, the formation of the conductive path is insufficient. In such a case, even when a voltage necessary for electron emission is applied, current in the element is not sufficient so that electron emission cannot be obtained. Further, in a case where the electric field intensity is more than $4.1 \times 10^7$ [V/m], large insulation breakdown is easily caused so that the conductive path itself is broken. Once this happens, even in a case where the voltage necessary for electron emission is applied, the current in the element does not flow at all, or even if the current flows, the current is not sufficient so that the electron emission cannot be obtained. When the electric field intensity in the above range, it is possible to form the electron emitting section by the forming process without any troubles.

Further, in the method of the present invention for producing an electron emitting element, it is preferable that in the step (a), the conductive fine particles be applied, by an inkjet method, to the surface of the fine particle layer so as to form depositions on the surface of the fine particle layer in a discrete manner.

As the method for discretely depositing the depositions of the conductive fine particles in the electron acceleration layer, there may be a spray application method using a mask, an electrostatic atomization method in which droplets of fine particles can be splashed without a mask, and the like method. However, by adopting the inkjet method, it is possible to easily and highly maintain controllability of applied positions and repeat reproduction of an amount of application.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The electron emitting element according to the present invention assures electric conductivity so that sufficient current in the element flows, thereby allowing ballistic electrons to be emitted from a thin-film electrode. As a result, in combination with a light emitting body, for example, the electron emitting element can be preferably applied to an image display device, or the like.

REFERENCE SIGNS LIST

1 Electron Emitting Element
2 Electrode Substrate
3 Thin-Film Electrode

4 Electron Acceleration Layer
5 Insulating Fine Particles
6 Conductive Fine Particles
7 Power Supply (Power Supply Section)
7A Power Supply
7B Power Supply
8 Counter Electrode
9 Electron Emitting Device
31, 31', 31" Light Emitting Device
32, 32' Luminous Body (Light Emitting Body)
33 ITO Film
34 Glass Substrate
35 Power Supply
36 Light Emitting Section
100 Electron Emitting Element
105 Fine particle layer
106 Deposition (Plane)
107 Depositions (Discrete)
140 Image Display Device
330 Liquid Crystal Panel

The invention claimed is:

1. An electron emitting element comprising:
an electrode substrate and a thin-film electrode, which are provided so as to face each other; and
an electron acceleration layer sandwiched between the electrode substrate and the thin-film electrode,
the electron emitting element (i) accelerating electrons in the electron acceleration layer at a time when a voltage is applied between the electrode substrate and the thin-film electrode and (ii) emitting the electrons from the thin-film electrode,
the electron acceleration layer including a fine particle layer containing insulating fine particles to which fine particle layer a single material or a mixed material that facilitates electricity flow in a thickness direction of the fine particle layer is applied,
the electron acceleration layer including a conductive path formed therein in advance such that the conductive path runs through the electron acceleration layer in a thickness direction of the electron acceleration layer, the conductive path having an exit serving as an electron emitting section via which the electrons are supplied to the thin-film electrode,
the single material or the mixed material being conductive fine particles,
the conductive fine particles being deposited on a surface of the fine particle layer so as to form a deposition, and
the deposition of the conductive fine particles having a physical recess serving as the electron emitting section.

2. The electron emitting element as set forth in claim 1, wherein:
the single material or the mixed material is applied to the fine particle layer in a discrete manner when the fine particle layer is viewed from its top face where a side, of the fine particle layer, that faces the electrode substrate is regarded as a bottom face.

3. An electron emitting element comprising:
an electrode substrate and a thin-film electrode, which are provided so as to face each other; and
an electron acceleration layer sandwiched between the electrode substrate and the thin-film electrode,
the electron emitting element (i) accelerating electrons in the electron acceleration layer at a time when a voltage is applied between the electrode substrate and the thin-film electrode and (ii) emitting the electrons from the thin-film electrode,
the electron acceleration layer including a fine particle layer containing insulating fine particles to which fine particle layer a single material or a mixed material that facilitates electricity flow in a thickness direction of the fine particle layer is applied, and
the electron acceleration layer including a conductive path formed therein in advance such that the conductive path runs through the electron acceleration layer in a thickness direction of the electron acceleration layer, the conductive path having an exit serving as an electron emitting section via which the electrons are supplied to the thin-film electrode,
wherein the single material or the mixed material is applied to the fine particle layer in a discrete manner when the fine particle layer is viewed from its top face where a side, of the fine particle layer, that faces the electrode substrate is regarded as a bottom face,
wherein:
a total surface area of portions, in the fine particle layer, to which the single material or the mixed material is applied is not less than 5% but not more than 90.6% with respect to a surface area of the fine particle layer, and
the thin-film electrode has a thickness of not less than 100 nm but not more than 500 nm.

4. The electro emitting element as set forth in claim 3, wherein:
the total surface area of the portions, in the fine particle layer, to which the single material or the mixed material is applied is not less than 10% with respect to the surface area of the fine particle layer.

5. The electron emitting element as set forth in claim 3, wherein:
the thickness of the thin-film electrode is not less than 160 nm.

6. The electron emitting element as set forth in claim 1, wherein:
the fine particle layer further includes binder resin that binds the insulating fine particles to one another.

7. The electron emitting element as set forth in claim 1, wherein:
the conductive fine particles are noble metal.

8. The electron emitting element as set forth in claim 1, wherein:
the conductive fine particles contain at least any one of gold, silver, platinum, palladium, and nickel.

9. The electron emitting element as set forth in claim 1, wherein:
the thin-film electrode contains at least any one of gold, silver, carbon, tungsten, titanium, aluminum, and palladium.

10. An electron emitting element comprising:
an electrode substrate and a thin-film electrode, which are provided so as to face each other; and
an electron acceleration layer sandwiched between the electrode substrate and the thin-film electrode,
the electron emitting element (i) accelerating electrons in the electron acceleration layer at a time when a voltage is applied between the electrode substrate and the thin-film electrode and (ii) emitting the electrons from the thin-film electrode,
the electron acceleration layer including a fine particle layer containing insulating fine particles to which fine particle layer a single material or a mixed material that facilitates electricity flow in a thickness direction of the fine particle layer is applied,
the electron acceleration layer including a conductive path formed therein in advance such that the conductive path runs through the electron acceleration layer in a thickness direction of the electron acceleration layer, the conductive path having an exit serving as an electron emitting section via which the electrons are supplied to the thin-film electrode, and the single material or the mixed material being a basic dispersant into which an electron donor that donates a pair of electrons is introduced as a substituent.

* * * * *